United States Patent
Baron et al.

(10) Patent No.: US 10,787,997 B1
(45) Date of Patent: Sep. 29, 2020

(54) ROCKET BOOSTER CASINGS MADE WITH SEMIPREG HAVING A THERMOPLASTIC TOUGHENED NOVOLAC-BASED EPOXY RESIN MATRIX

(71) Applicant: HEXCEL CORPORATION, Dublin, CA (US)

(72) Inventors: Kathlyn Lizette Baron, Dublin, CA (US); Gordon Emmerson, Dublin, CA (US); Yen-Seine Wang, San Ramon, CA (US)

(73) Assignee: HEXCEL CORPORATION, Dublin, CA (US)

( * ) Notice: Subject to any disclaimer, the term of this patent is extended or adjusted under 35 U.S.C. 154(b) by 0 days.

(21) Appl. No.: 16/592,589

(22) Filed: Oct. 3, 2019

Related U.S. Application Data

(60) Division of application No. 15/839,467, filed on Dec. 12, 2017, now Pat. No. 10,472,474, which is a continuation-in-part of application No. 15/622,585, filed on Jun. 14, 2017, now Pat. No. 10,106,661, which is a continuation-in-part of application No. 15/439,981, filed on Feb. 23, 2017, now Pat. No. 10,000,615, which is a continuation-in-part of application No. 15/189,994, filed on Jun. 22, 2016, now Pat. No. 10,208,176.

(51) Int. Cl.
| | |
|---|---|
| F02K 9/34 | (2006.01) |
| B29C 70/50 | (2006.01) |
| B29B 15/12 | (2006.01) |
| C08L 63/04 | (2006.01) |
| C08L 77/06 | (2006.01) |
| C08L 79/08 | (2006.01) |

(52) U.S. Cl.
CPC .............. *F02K 9/34* (2013.01); *B29B 15/122* (2013.01); *B29C 70/50* (2013.01); *C08L 63/04* (2013.01); *C08L 77/06* (2013.01); *C08L 79/08* (2013.01)

(58) Field of Classification Search
None
See application file for complete search history.

(56) References Cited

U.S. PATENT DOCUMENTS

| | | |
|---|---|---|
| 6,117,518 A | 9/2000 | Cawse et al. |
| 6,399,714 B1 | 6/2002 | Huang et al. |
| 7,968,179 B2 | 6/2011 | Tilbrook et al. |
| 8,097,333 B2 | 1/2012 | Tilbrook et al. |
| 8,470,923 B2 | 6/2013 | Boyle et al. |
| 8,686,069 B2 | 4/2014 | Wang |
| 8,846,818 B2 | 9/2014 | Wei et al. |
| 9,187,606 B2 | 11/2015 | Fisset et al. |
| 9,187,636 B2 | 11/2015 | Wang et al. |
| 9,200,125 B2 | 12/2015 | Wang et al. |
| 10,106,661 B2 | 10/2018 | Zhu et al. |
| 10,208,176 B2 | 2/2019 | Emmerson et al. |
| 2007/0027233 A1 | 2/2007 | Yamaguchi et al. |
| 2010/0108259 A1 | 5/2010 | Aspin |
| 2010/0304118 A1 | 12/2010 | Baidak et al. |
| 2011/0171034 A1 | 7/2011 | Whiter |
| 2012/0164455 A1 | 6/2012 | Griffin et al. |
| 2013/0115410 A1 | 5/2013 | Whiter |
| 2014/0058013 A1* | 2/2014 | Wang ................ C08L 63/00 523/427 |
| 2014/0135443 A1 | 5/2014 | Aerts et al. |
| 2014/0163139 A1 | 6/2014 | Wang et al. |
| 2014/0170408 A1 | 6/2014 | Frulloni et al. |
| 2014/0364568 A1 | 12/2014 | Wei et al. |
| 2016/0122528 A1 | 5/2016 | Kobayashi et al. |
| 2016/0152782 A1 | 6/2016 | Cammage et al. |

FOREIGN PATENT DOCUMENTS

| | | |
|---|---|---|
| EP | 2799460 A1 | 11/2011 |
| EP | 2691199 B1 | 11/2016 |
| EP | 2240538 B1 | 8/2017 |
| WO | 2014/011293 | 1/2014 |
| WO | 2014/060813 | 4/2014 |

* cited by examiner

*Primary Examiner* — Ana L. Woodward
(74) *Attorney, Agent, or Firm* — W. Mark Bielawski; David J. Oldenkamp

(57) ABSTRACT

A semipreg that can be cured/molded to form aerospace composite parts including rocket booster casings. The semipreg includes a fibrous layer and a resin layer located on one side of the fibrous layer. The resin layer includes an epoxy component that is a combination of a hydrocarbon epoxy novolac resin and a trifunctional epoxy resin and optionally a tetrafunctional epoxy resin. The resin matrix includes polyethersulfone as a toughening agent and a thermoplastic particle component.

12 Claims, 3 Drawing Sheets

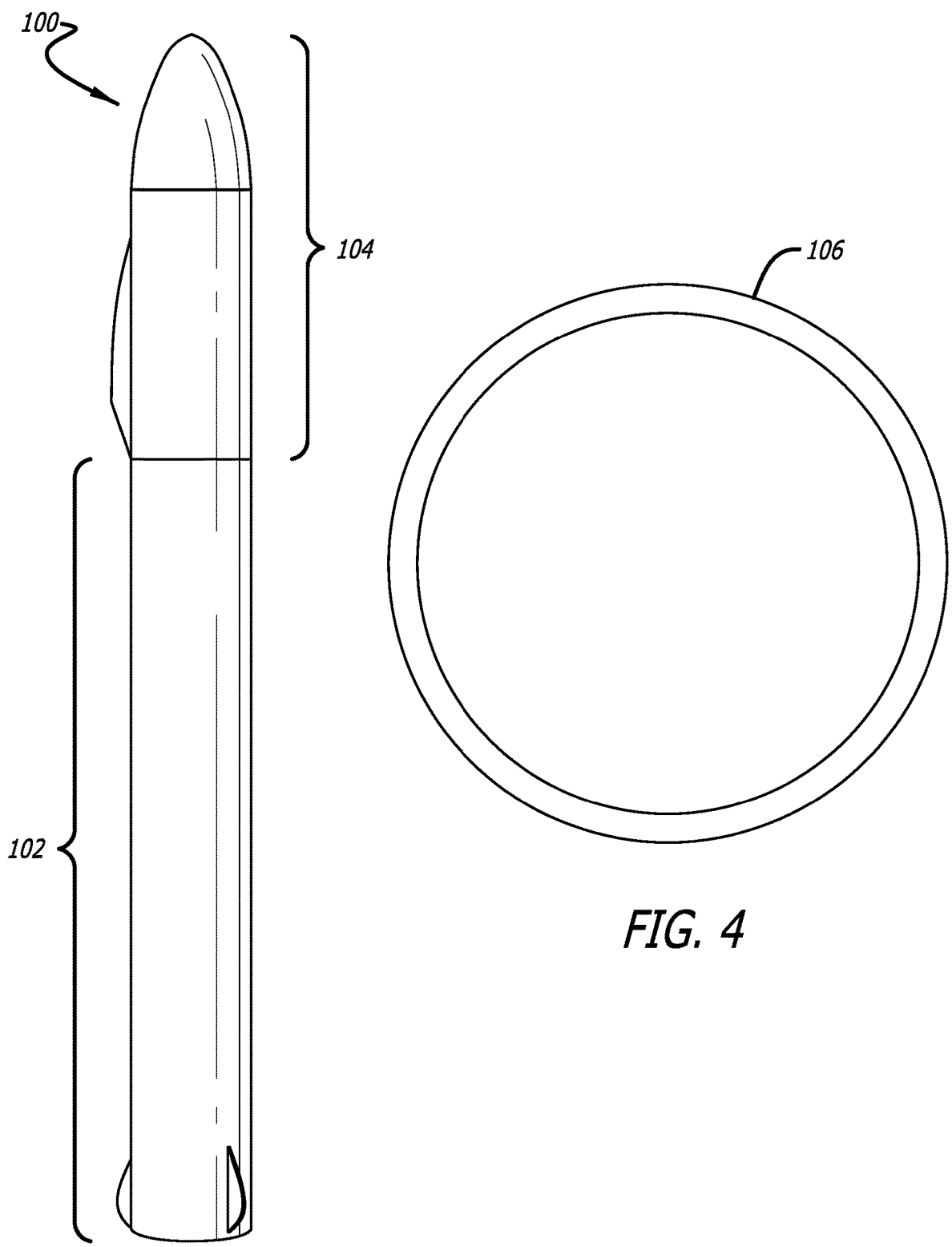

US 10,787,997 B1

ROCKET BOOSTER CASINGS MADE WITH SEMIPREG HAVING A THERMOPLASTIC TOUGHENED NOVOLAC-BASED EPOXY RESIN MATRIX

This application is a divisional of co-pending U.S. Ser. No. 15/839,467, filed on Dec. 12, 2017, which is a continuation-in-part of U.S. Ser. No. 15/622,585, filed on Jun. 14, 2017, which issued as U.S. Pat. No. 10,106,661 on Oct. 23, 2018. U.S. Ser. No. 15/622,585 is a continuation in part of U.S. Ser. No. 15/439,981, filed on Feb. 23, 2017, which issued as U.S. Pat. No. 10,000,615 on Jun. 19, 2018. U.S. Ser. No. 15/622,585 is also a continuation-in-part of U.S. Ser. No. 15/189,994, filed on Jun. 22, 2016, which issued as U.S. Pat. No. 10,208,176 on Feb. 9, 2019.

BACKGROUND OF THE INVENTION

1. Field of the Invention

The present invention relates generally to pre-impregnated composite material (prepreg) that is used in making high performance composite parts that are especially well-suited for use as aerospace components. The present invention is directed to novolac-based epoxy resins that are toughened with thermoplastic materials and used as the resin matrix in such prepreg. More particularly, the present invention is directed to prepreg that include a thermoplastic toughened epoxy resin matrix that is composed of novolac epoxy resin and triglycidyl aminophenol epoxy resin.

2. Description of Related Art

Composite materials are typically composed of a resin matrix and reinforcing fibers as the two primary constituents. Composite materials are often required to perform in demanding environments, such as in the field of aerospace where the physical limits and characteristics of the composite part is of critical importance.

Pre-impregnated composite materials are used widely in the manufacture of composite parts. Prepreg is a combination that typically includes uncured resin and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network affect the structural properties of the part.

Prepreg is used in manufacturing space vehicles (rocket boosters and spacecraft) and load-bearing or primary aircraft structural parts, such as wings, fuselages, bulkheads and control surfaces. It is important that these parts have sufficient strength, damage tolerance and other requirements that are routinely established for such parts and structures.

The fiber reinforcements that are commonly used in aerospace prepreg are multidirectional woven fabrics or unidirectional tape that contains fibers extending parallel to each other. The fibers are typically in the form of a bundle of numerous individual fibers or filaments that is referred to as a "tow". The fibers or tows can also be chopped and randomly oriented in the resin to form a non-woven mat. These various fiber reinforcement configurations are combined with a carefully controlled amount of uncured resin. The resulting prepreg is typically placed between protective layers and rolled up for storage or transport to the manufacturing facility. Combinations of carbon fibers and an epoxy resin matrix have become a popular combination for aerospace prepreg.

Prepreg may also be in the form of short segments of chopped unidirectional tape that are randomly oriented to form a non-woven mat of chopped unidirectional tape. This type of prepreg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers. This material is commonly used as a sheet molding compound to form parts and molds for use in making parts.

The compressive and tensile strengths of a cured composite part are largely dictated by the individual properties of the reinforcing fiber and matrix resin, as well as the interaction between these two components. In addition, the fiber-resin volume ratio is an important factor. In many aerospace applications, it is desirable that the composite part exhibit high compression and tensile strengths. The open hole compression (OHC) test is a standard measure of the compression strength of a composite material. The open hole tension (OHT) test is also a standard measure of the tensile strength of a composite material.

In many aerospace applications, it is desirable that the composite part exhibit high compression and/or tensile strength under both room temperature/dry conditions and hot/wet conditions. However, attempts to keep compression and tensile strengths high often results in negative effects on other desirable properties, such as damage tolerance and interlaminar fracture toughness.

Selecting higher modulus resins can be an effective way to increase the compression strength of a composite. However, this can result in a tendency to reduce damage tolerance, which is typically measured by a decrease in compressive properties, such as compression after impact (CAI) strength. Accordingly, it is can be difficult to achieve a simultaneous increase in both the compression and/or tensile strengths without deleteriously affecting the damage tolerance.

Multiple layers of prepreg are commonly used to form composite parts that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G1c (End Notch Flex) tests. In Mode I, the pre-cracked laminate failure is governed by peel forces and in Mode II the crack is propagated by shear forces.

One approach to increasing interlaminar fracture toughness for parts made from carbon fiber/epoxy resin prepreg has been to introduce thermoplastic sheets as interleaves between layers of prepreg. However, this approach tends to yield stiff, tack-free materials that are difficult to use. Another approach has been to add thermoplastic particles to the epoxy resin so that a resin interlayer containing the thermoplastic particles is formed between the fiber layers of the final part. Polyamides have been used as such thermoplastic particles. It also has been known to include a thermoplastic toughening agent in the epoxy resin. The toughening agent, such as polyether sulfone (PES) or polyetherimide (PEI), is dissolved in the epoxy resin before it is applied to the carbon fibers. Thermoplastic toughened epoxy resins, which include a combination of both thermoplastic toughening particles and a thermoplastic toughening agent, have been used in combination with carbon fiber to make aerospace prepreg.

The epoxy resin matrix may include one or more types of epoxy resin. It is known that various combinations of different types of epoxy resins may result in a wide variation in the properties of the final composite part. The curing agent used to cure the epoxy resin matrix can also substantially affect the properties of the final composite part. When formulating an epoxy resin for use as the resin matrix in aerospace prepreg, it is difficult to predict if a new combination of epoxy resin types and curatives will provide the desired combination of properties required for aerospace parts. This is especially the case when a thermoplastic toughening agent and thermoplastic particles form part of the epoxy resin formulation. Accordingly, there is a great deal of testing involved when one attempts to formulate new thermoplastic toughened epoxy resins in order to determine if the resin is suitable for use as resin matrix in aerospace prepreg.

Although existing aerospace prepregs are well suited for their intended use in providing composite parts that are strong and damage tolerant, there still is a continuing need to provide aerospace prepreg that may be used to make composite parts that exhibit desirable combinations of high tensile and compressive strengths (OHC AND OHT) while maintaining high levels of damage tolerance (CAI) and interlaminar fracture toughness (G1c and G2c).

SUMMARY OF THE INVENTION

In accordance with the present invention, pre-impregnated composite materials (prepreg) are provided that can be molded to form composite parts that have high levels of strength and also have high levels of damage tolerance and interlaminar fracture toughness.

The pre-impregnated composite materials of the present invention are composed of reinforcing fibers and an uncured resin matrix. The uncured resin matrix includes a resin component made up of a novolac epoxy resin and triglycidyl aminophenol epoxy resin or a combination of triglycidyl aminophenol epoxy and a tetrafunctional epoxy. The uncured resin matrix further includes a thermoplastic particle component, a thermoplastic toughening agent and a curing agent.

The present invention also covers methods for making the prepreg and methods for molding the prepreg into a wide variety of composite parts. The invention also covers the composite parts that are made using the improved prepreg.

It has been found that resins having the matrix resin formulation, as set forth above, can be used to form prepreg that can be molded to form composite parts that have unexpectedly high levels of interlaminar fracture toughness.

The above described and many other features and attendant advantages of the present invention will become better understood by reference to the following detailed description when taken in conjunction with the accompanying drawings.

BRIEF DESCRIPTION OF THE DRAWINGS

FIG. 3 is a side view of a space vehicle composed of a rocket booster and spacecraft.

FIG. 4 is a simplified sectional view of the rocket booster portion of the space vehicle showing the cylindrical rocket booster casing.

DETAILED DESCRIPTION OF THE INVENTION

Uncured epoxy resin compositions in accordance with the present invention may be used in a wide variety of situations where a thermoplastic-toughened epoxy resin matrix is desired. Although the uncured epoxy resin composition may be used alone, the compositions are generally used as a matrix resin that is combined with a fibrous support to form composite material composed of the fibrous support and the resin matrix. The composite materials may be in the form of a prepreg, partially cured prepreg or a completely cured final part. The term "uncured", when used herein in connection with: prepreg; the resin before impregnation into the fibrous support; the resin matrix that is formed when the fibrous support is impregnated with the resin; or composite material, is intended to cover items that may have been subjected to some curing, but which have not been completely cured to form the final composite part or structure.

Although the uncured composite materials may be used for any intended purpose, they are preferably used in making parts for aerospace vehicles, such as commercial or military aircraft and rocket booster casings. For example, the uncured composite materials may be used to make non-primary (secondary) aircraft structures. However the preferred use of the uncured composite material is for structural applications, such as primary aircraft structures. Primary aircraft structures or parts are those elements of either fixed-wing or rotary wing aircraft that undergo significant stress during flight and which are essential for the aircraft to maintain controlled flight. The uncured composite materials may also be used for other structural applications to make load-bearing parts and structures in general.

Figure 1:
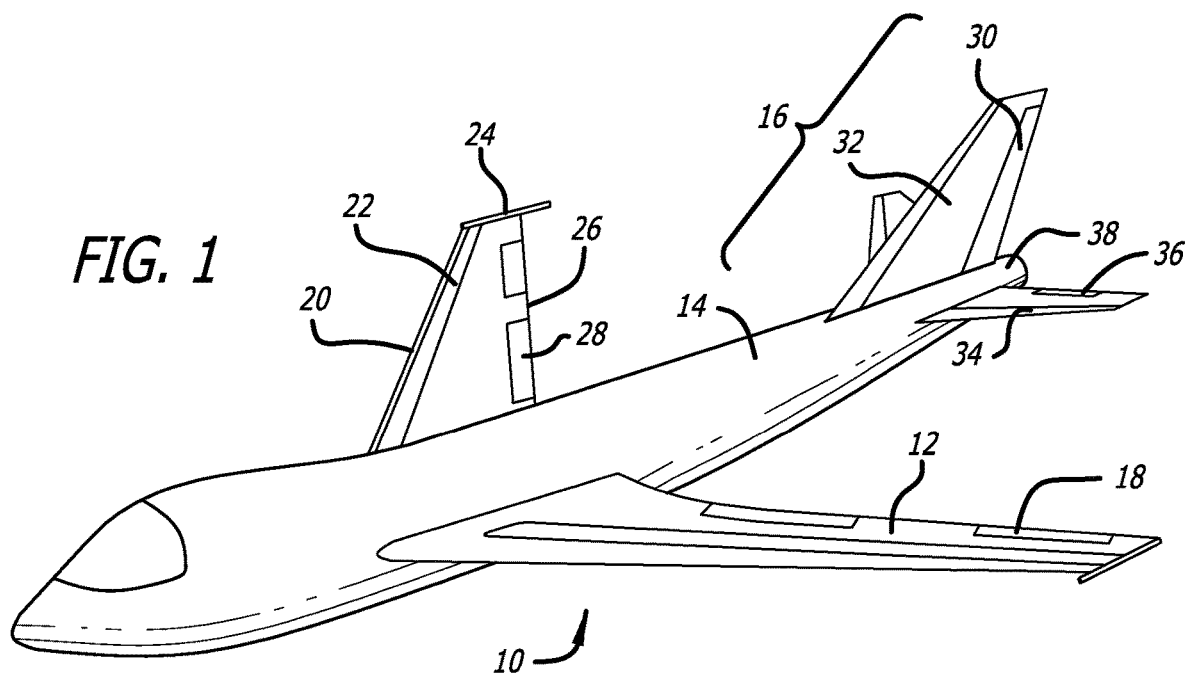
FIG. 1 is a perspective view of an aircraft, which depicts exemplary primary aircraft structures that can be made using composite materials in accordance with the present invention.
Figure 2:
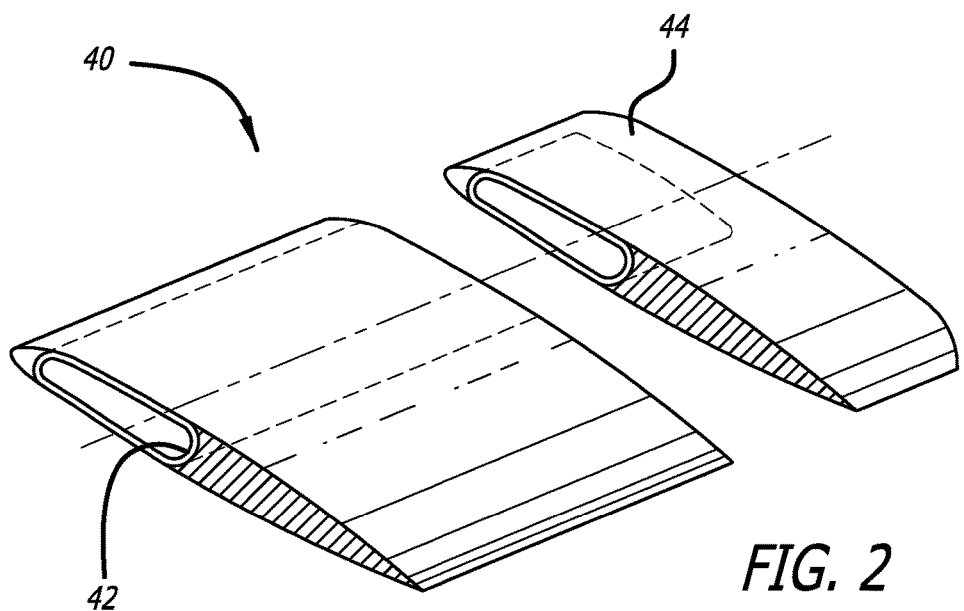
FIG. 2 is a partial view of a helicopter rotor blade, which depicts exemplary primary aircraft structures that can be made using composite materials in accordance with the present invention.

FIG. 1 depicts a fixed-wing aircraft at 10 that includes a number of exemplary primary aircraft structures and parts that may be made using uncured composite materials in accordance with the present invention. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32, horizontal stabilizer 34, elevators 36 and tail 38. FIG. 2 depicts the outer end portions of a helicopter rotor blade 40 which includes a spar 42 and outer surface 44 as primary aircraft structures. Other exemplary primary aircraft structures include wing spars, and a variety of flanges, clips and connectors that connect primary parts together to form primary structures.

The pre-impregnated composite materials (prepreg) of the present invention may be used as a replacement for existing prepreg that is being used to form composite parts in the aerospace industry and in any other application where high structural strength and damage tolerance is required. The invention involves substituting the resin formulations of the present invention in place of existing resins that are being used to make prepreg. Accordingly, the resin formulations of the present invention are suitable for use as the matrix resin in conventional prepreg manufacturing and curing processes.

The pre-impregnated composite materials of the present invention are composed of reinforcing fibers and an uncured resin matrix. The reinforcing fibers can be any of the conventional fiber configurations that are used in the prepreg and composite sheet molding industry. Carbon fibers are preferred as the reinforcing fibers.

The resin used to form the resin matrix (matrix resin) includes a resin component that is made up of a hydrocarbon epoxy novolac resin in combination with a trifunctional epoxy resin and optionally a tetrafunctional epoxy resin. The matrix resin further includes a thermoplastic particle component, a thermoplastic toughening agent and a curing agent.

The hydrocarbon epoxy novolac resin preferably has a dicyclo-pentadiene backbone and is available commercially from Huntsman Corporation (The Woodlands, Tex.) as TACTIX 556. This type of hydrocarbon novolac resin is referred to herein as a dicyclopentadiene novolac epoxy resin. The chemical formula for TACTIX 556 is

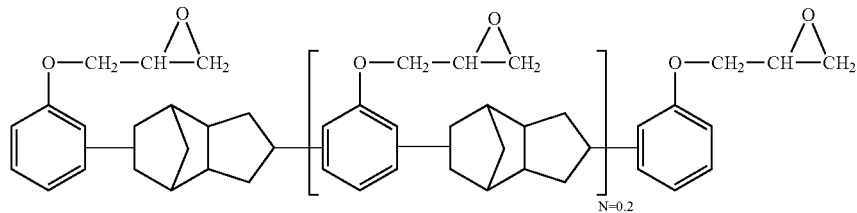

TACTIX 556 is an amber to dark colored semi-solid hydrocarbon epoxy novolac resin that has an epoxy index (ISO 3001) of 4.25 to 4.65 eq/kg and epoxy equivalent (ISO 3001) of 215-235 g/eq. The viscosity of TACTIX 556 at 79° C. (ISO 9371B) is 2250 mPa s. Dicyclopentadiene epoxy novolac resins other than TACTIX 556 may be used in place of TACTIX 556 provided they have the same chemical formula and properties. For example, another suitable dicyclopentadiene epoxy novolac resin is XD-1000-2L which is available commercially from Nippon Kayaku Co., Ltd (Chiyoda-ku, Tokyo). TACTIX 556 is the preferred hydrocarbon epoxy novolac resin for use in accordance with the present invention.

When a tetrafunctional epoxy resin is included in the resin component, the amount of hydrocarbon epoxy novolac resin present in the uncured resin may vary from 8 to 20 weight percent based on the total weight of the uncured resin matrix. Preferably, the uncured resin will contain from 10 to 17 weight percent dicyclopentadiene hydrocarbon epoxy novolac resin. Uncured resin formulations that contains from 13 to 15 weight percent dicyclopentadiene hydrocarbon epoxy novolac resin are particularly preferred because they provide an unexpectedly high G2c of about 13 when the ratio of polyimide particles to polyamide particles is from 3.2:1 to 2.8:1. In this embodiment of the invention, which is referred to herein as the DEN/TRIF/TETF matrix resin, the uncured resin component is composed of dicyclopentadiene epoxy novolac resin, a trifunctional epoxy resin and a tetrafunctional epoxy resin.

In the DEN/TRIF/TETF matrix resin, a preferred exemplary trifunctional epoxy resin is triglycidyl para-aminophenol. Triglycidyl para-aminophenol is available commercially from Huntsman Advanced Materials (The Woodlands, Tex.) under the trade name Araldite MY0510. Another suitable trifunctional epoxy resin is triglycidyl meta-aminophenol. Triglycidyl meta-aminophenol is available commercially from Huntsman Advanced Materials (The Woodlands, Tex.) under the trade name Araldite MY0600 and from Sumitomo Chemical Co. (Osaka, Japan) under the trade name ELM-120. Other trifunctional epoxy resins may be used provided that they have properties that are the same or similar to the properties of triglycidyl para-aminophenol or triglycidyl meta-aminophenol.

In the DEN/TRIF/TETF matrix resin embodiment, an exemplary tetrafunctional epoxy resin is N,N,N',N'-tetraglycidyl-4,4'-diaminodiphenyl methane (TGDDM) which is available commercially as Araldite MY720 and MY721 from Huntsman Advanced Materials (The Woodlands, Tex.), or ELM 434 from Sumitomo Chemical Industries, Ltd. (Chuo, Tokyo). Other tetrafunctional epoxy resins may be used provided that they have properties that are the same or similar to the properties of N,N,N',N'-tetraglycidyl-4,4'-diaminodiphenyl methane.

In the DEN/TRIF/TETF matrix resin, the total amount of trifunctional and tetrafunctional epoxy resin may vary from 35 to 45 weight percent based on the total weight of the uncured resin. It is preferred that that the weight ratio between the trifunctional and tetrafunctional resins be from 1.0:1.5 to 1.5:1.0. It is particularly preferred that the weight ratio between the trifunctional and tetrafunctional resins be from 1.1:1.0 to 1.3:1.0.

In another embodiment of the invention, the resin component contains only dicyclopentadiene novolac epoxy resin and triglycidyl aminophenol epoxy resin. In the resin component of this embodiment, which is referred to herein as the DEN/TRIF matrix resin, the dicyclopentadiene novolac epoxy resin is present in the range 4 wt % to 30 wt %, based on the total weight of the uncured resin matrix. Preferably, the dicyclopentadiene novolac epoxy resin is present in the range 17 wt % to 27 wt %, based on the total weight of the uncured resin matrix. More preferably, the dicyclopentadiene novolac epoxy resin is present in the range 20 wt % to 24 wt %, based on the total weight of the uncured resin matrix.

In the DEN/TRIF matrix resin, the triglycidyl aminophenol epoxy resin is present in the range 20 wt % to 55 wt %, based on the total weight of the uncured resin matrix.

Preferably, the triglycidyl aminophenol epoxy resin is present in the range 26 wt % to 36 wt %, based on the total weight of the uncured resin matrix. More preferably, the triglycidyl aminophenol epoxy resin is present in the range 29 wt % to 33 wt %, based on the total weight of the uncured resin matrix. Triglycidyl meta-aminophenol is the preferred type of triglycidyl aminophenol epoxy resin for the DEN/TRIF matrix resin.

In the DEN/TRIF matrix resin, the weight ratio of triglycidyl aminophenol epoxy resin to dicyclopentadiene novolac epoxy resin may vary from 1:1 to 10.5:1. The preferred weight ratio range of triglycidyl aminophenol epoxy resin to dicyclopentadiene novolac epoxy resin is from 1.2:1 to 1.6:1. Most preferred is a weight ratio of triglycidyl aminophenol epoxy resin to dicyclopentadiene novolac epoxy resin that is about 1.4:1.

The uncured resin matrix in accordance with the present invention also includes a thermoplastic particle component that contains one or more types of thermoplastic particles. Exemplary thermoplastic particles are polyamide particles which are formed from the polymeric condensation product of a methyl derivative of bis(4-aminocyclohexyl)methane and an aliphatic dicarboxylic acid selected from the group consisting of decane dicarboxylic acid and dodecane dicarboxylic acid. Methyl derivatives of bis(4-aminocyclohexyl) methane, which are referred to herein as the "amine component" are also known as methyl derivatives of 4,4'-diaminocyclohexylmethane. This type of polyamide particle and the methods for making them are described in detail in U.S. Pat. Nos. 3,936,426 and 5,696,202, the contents of which are hereby incorporated by reference.

The formula for the amine component of the polymeric condensation product is

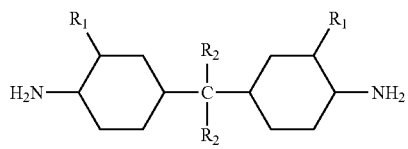

where $R_2$ is hydrogen and $R_1$ is either methyl or hydrogen.

The formula for the monomeric unit of the polymeric condensation product may be represented as follows:

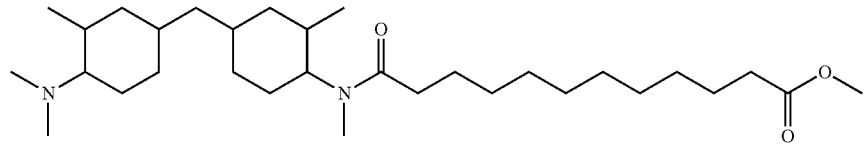

The molecular number of the polymeric condensation product will range from 14,000 to 20,000 with a molecular numbers of about 17,000 being preferred.

The polyamide particles should have particle sizes of below 100 microns. It is preferred that the particles range in size from 5 to 60 microns and more preferably from 10 to 30 microns. It is preferred that the average particle size is from 15 to 25 microns. The polyamide particles may be regular or irregular in shape. For example, the particles may be substantially spherical or they can be particles with a jagged shape.

One exemplary polyamide particle is made from polyamide where the amine component of the polymeric condensation product has the above formula in which $R_1$ both are methyl and $R_2$ both are hydrogen. Such polyamide particles may be made from the polymeric condensation product of 3,3'-dimethyl-bis(4-aminocyclohexyl)-methane and 1,10-decane dicarboxylic acid. The polyamide particles are made by combining, in a heated receiving vessel, 13,800 grams of 1,10-decane dicarboxylic acid and 12,870 grams of 3,3'-dimethyl-bis(4-aminocyclohexyl)methane with 30 grams of 50% aqueous phosphoric acid, 150 grams benzoic acid and 101 grams of water. The mixture is stirred in a pressure autoclave until homogeneous. After a compression, decompression and degassing phase, the polyamide condensation product is pressed out as a strand, passed under cold water and granulated to form the polyamide particles. Polyamide particles where $R_1$ both are methyl and $R_2$ both are hydrogen can also be made from GRILAMID TR90, which is commercially available from EMS-Chime (Sumter, S.C.). GRILAMID TR90 is the polymeric condensation product of 3,3'-dimethyl-bis(4-aminocyclohexyl)-methane and 1,10-decane dicarboxylic acid.

Another exemplary polyamide particle is made from polyamide where the amine component of the polymeric condensation product has the above formula in which $R_1$ both are methyl and $R_2$ both are methyl. Such polyamide particles may be made in the same manner as described above, except that polyamide is the polymeric condensation product of 3,3'-dimethyl-bis(4-aminocyclohexyl)-propane and 1,10-decane dicarboxylic acid. Polyamide particles where $R_1$ both are methyl and $R_2$ both are methyl can also be made from CX7323, which is commercially available from Evonik (Mobile, Ala.). CX7323 is the polymeric condensation product of 3,3'-dimethyl-bis(4-aminocyclohexyl)-propane and 1,10-decane dicarboxylic acid. Mixtures of these two exemplary polyamide particles may be used, if desired.

The thermoplastic particle component may include one or more types of polyamide particles that are typically used in thermoplastic toughened epoxy resins including, for example, polyamide (PA) 11, PA6, PA12, PA6/PA12 copolymer, PA4, PA8, PA6.6, PA4.6, PA10.10, PA6.10 and PA10.12.

A preferred thermoplastic particle component contains a first group of polyamide particles which do not contain crosslinked polyamide and a second group of polyamide particles that do contain crosslinked polyamide.

The first group of polyamide particles may be any of the polyamide particle that do not contain crosslinked polyamide and which are typically used in thermoplastic toughened epoxy-based prepreg. Such particles may be composed of polyamide (PA) 11, PA6, PA12, PA6/PA12 copolymer, PA4, PA8, PA6.6, PA4.6, PA10.10, PA6.10 and PA10.12. Non-crosslinked polyamide particles are available commercially from a number of sources. Suitable non-crosslinked polyamide 12 particles are available from Kobo Products under the trade name SP10L. SP10L particles contain over 98 wt % PA 12. The particle size distribution is from 7 microns to 13 microns with the average particle size being 10 microns. The density of the particles is 1 g/cm³. It is preferred that the PA12 particles are at least 95 wt % PA12, excluding moisture content.

Other suitable non-crosslinked particles are available from Arkema (Colombes, France) under the tradenames Orgasol 1002 powder and Orgasol 3803 powder. Orgasol 1002 powder is composed of 100% PA6 particles having an average particle size of 20 microns. Orgasol 3803 is composed of particles that are a copolymer of 80% PA12 and 20% PA6 with the mean particle size being from 17 to 24 microns. Orgasol 2002 is a powder composed of non-crosslinked PA12 particles that may also be used in the first group of particles.

The preferred non-crosslinked polyamide particles for the first group of thermoplastic particles are polyamide 11 particles, which are also available commercially from a number of sources. The preferred polyamide 11 particles are available from Arkema (Colombes, France) under the trade name Rislan PA11. These particles contain over 98 wt % PA 11 and have a particle size distribution of 15 microns to 25 microns. The average particle size is 20 microns. The density of the Rislan PA11 particles is 1 g/cm³. It is preferred that the PA 11 particles are at least 95 wt % PA11, excluding moisture content.

The second group of thermoplastic polyamide particles are particles that contain crosslinked polyamide on the surface of the particle, in the interior of the particle or both. The crosslinked polyamide particles may be made from polyamide that has been crosslinked prior to particle formation or non-crosslinked polyamide particles may be treated with suitable crosslinking agents to produce crosslinked polyamide particles.

Suitable crosslinked particles contain crosslinked PA11, PA6, PA12, PA6/PA12 copolymer, PA4, PA8, PA6.6, PA4.6, PA10.10, PA6.10 and PA10.12. Any of the crosslinking agents commonly used to cross link polyamide are suitable. Exemplary crosslinking agents are epoxy-based crosslinking agents, isocyanate-based crosslinking agents, carbodiimide-based crosslinking agents, acyllactam-based crosslinking agents and oxazoline-based crosslinking agent. Preferred crosslinked particles are PA12 particles that contain PA12 that has been crosslinked with an epoxy crosslinking agent. The procedures used to cross link thermoplastic polymers, including polyamide, are known. For examples, see U.S. Pat. Nos. 6,399,714, 8,846,818 and U.S. Published Patent Application US 2016/0152782 A1. The contents of these three references are hereby incorporated by reference.

Crosslinked PA12 particles are available commercially from Arkema (Colombes, France) under the tradename ORGASOL 2009 polyamide powder, which is also known as CG352. The PA12 particles present in ORGASOL 2009 polyamide powder are composed of at least 40% PA12 that has been cross linked with an epoxy-based crosslinking agent. The ORGASOL 2009 crosslinked polyamide particles have an average particle size of 14.2 microns with only 0.2% of the particles having a diameter of greater than 30 microns. The melting point of ORGASOL 2009 crosslinked particles is 180° C. The specific surface area of the ORGASOL 2009 particles is 1.9 and the moisture content of the particles is 0.34%.

The crosslinked polyamide particles should each contain from 40 to 70% crosslinked polyamide. Preferably, the crosslinked polyamide particles should each contain from 40 to 60% crosslinked polyamide.

Preferably, both the non-crosslinked and crosslinked polyamide particles should have particle sizes of below 100 microns. It is preferred that the particles range in size from 5 to 60 microns and more preferably from 5 to 30 microns. It is preferred that the average particle size is from 5 to 20 microns. The particles may be regular or irregular in shape. For example, the particles may be substantially spherical or they can be particles with a jagged shape. It is preferred that the non-crosslinked particles have an average particle size that is larger than the crosslinked particles. Preferably, the average non-crosslinked particles size will range from 15 to 25 microns and the average crosslinked particle size will range from 10 to 20 microns.

The thermoplastic particle component is present in the range 5 wt % to 20 wt %, based on the total weight of the uncured resin matrix. Preferably, there will be from 7 to 17 wt % thermoplastic particle component. The relative amounts of non-crosslinked and crosslinked particles may be varied when a combination of crosslinked and non-crosslinked particles are used. Weight ratios of non-crosslinked particles to crosslinked particles may range from 4:1 to 1.5:1. Preferably, the weight ratios of non-crosslinked particles to crosslinked particles will range from 3.5:1 to 2.5:1. A combination of non-crosslinked and crosslinked particles is a preferred thermoplastic particle component for use with the DEN/TRIF matrix resin embodiment.

In the DEN/TRIF matrix resin embodiment, the total amount of polyamide particles in the uncured resin may vary from 9 to 21 weight percent based on the total weight of the uncured resin. Preferably, the total amount of polyamide particles in the uncured resin will range from 11 wt % to 19 wt %, based on the total weight of the uncured resin matrix. More preferably, the total amount of polyamide particles in the uncured resin will range from 12 wt % to 17 wt %, based on the total weight of the uncured resin matrix.

The thermoplastic particle component may include a combination of polyimide particles and polyamide particles where the polyamide particles are composed of the polymeric condensation product of a methyl derivative of bis(4-aminocyclohexyl)methane and an aliphatic dicarboxylic acid. This particle combination is a preferred thermoplastic particle component for use with the DEN/TRIF/TETF matrix resin embodiment.

Preferred polyimide particles are available commercially from HP Polymer GmbH (Lenzig, Austria) as P84 polyimide molding powder. Suitable polyamide particles are also available commercially from Evonik Industries (Austria) under the tradename P84NT. The polyimide used to make the particles is disclosed in U.S. Pat. No. 3,708,458, the contents of which is hereby incorporated by reference. The polyimide is made by combining benzophenone-3,3',4,4'-tetracarboxylic acid dianhydride with a mixture of 4,4'-methylenebis (phenyl isocyanate) and toluene diisocyanate (2,4- or 2,6-isomer). The amine analogs may be used in place of the aromatic iso- and diisocyanates. The CAS Registry No. of the polyimide is 58698-66-1.

The polyimide particles are composed of an aromatic polyimide having the repeating monomer formula:

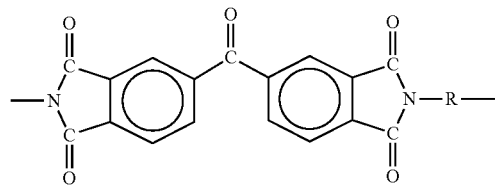

where from 10 to 90% of the R groups in the overall polymer are an aromatic group having the formula:

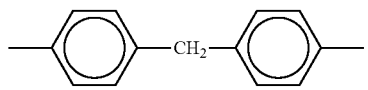

with the remaining R groups in the polymer being

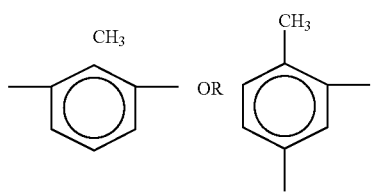

The size of the polyimide particles in the powder typically ranges from 2 microns to 35 microns. A preferred polyimide powder will contain particles that range in size from 2 to 30 microns with the average particle size ranging from 5 microns to 15 microns. Preferably, at least 90 weight percent of the polyimide particles in the powder will be in the size range of 2 microns to 20 microns. The polyimide particles may be regular or irregular in shape. For example, the particles may be substantially spherical or they can be particles with a jagged shape.

The polyimide particles contain at least 95 weight percent polyimide. Small amounts (up to 5 weight percent) of other materials may be included in the particles provided that they do not adversely affect the overall characteristics of the particles.

The glass transition temperature (Tg) of the polyimide particles should be about 330° C. with the density of individual particles being 1.34 grams per cubic centimeter. The linear coefficient of thermal expansion of the particles is 50.

The total amount of thermoplastic particles in the uncured DEN/TRIF/TETF matrix resin embodiment is preferably from 9 to 15 weight percent based on the total weight of the uncured resin. In order to obtain high resistance to delamination, the weight ratio between the polyamide particles and the polyimide particles can range from 3.5:1.0 to 1.0:1.0. Preferably, the weight ratio between the polyamide particles and polyimide particles is between 3.2:1.0 and 2.8:1.0. In a particularly preferred DEN/TRIF/TETF matrix resin, the amount of polyimide particles is from 8 to 10 weight percent of the total weight of the uncured resin and the amount of polyamide particles is from 2 to 4 weight percent of the total weight of the uncured resin.

The uncured resin matrix includes at least one curing agent. Suitable curing agents are those which facilitate the curing of the epoxy-functional compounds of the invention and, particularly, facilitate the ring opening polymerization of such epoxy compounds. In a particularly preferred embodiment, such curing agents include those compounds which polymerize with the epoxy-functional compound or compounds, in the ring opening polymerization thereof. Two or more such curing agents may be used in combination.

Suitable curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylene-tetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amines, including aromatic amines, e.g., 1,3-diaminobenzene, 1,4-diaminobenzene, 4,4'-diamino-diphenylmethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS). Also, suitable curing agents may include polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Different commercially available compositions may be used as curing agents in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1,3-diaza-2, 4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals, Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

The curing agent(s) is selected so that it provides curing of the matrix at suitable temperatures. The amount of curing agent required to provide adequate curing of the matrix will vary depending upon a number of factors including the type of resin being cured, the desired curing temperature and curing time. Curing agents typically may also include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS), both commercially available from Huntsman.

The curing agent is present in an amount that ranges from 10 wt % to 30 wt % of the uncured resin matrix. In the DEN/TRIF matrix resin, the curing agent is present in an amount that ranges from 17 wt % to 27 wt %. More preferably, the curing agent is present in the range 21 wt % to 25 wt % of the uncured resin matrix. In the DEN/TRIF matrix resin, 4,4'-DDS is a preferred curing agent. It is preferably used as the sole curing agent in an amount ranging from 20 wt % to 26 wt %. Small amounts (less than 5 wt %) of other curatives, such as 3,3'-DDS, may be included, if desired.

In the DEN/TRIF/TETF matrix resin, the curing agent is present in an amount that ranges from 15 wt % to 30 wt % of the uncured resin. Preferably, the curing agent is present in an amount that ranges from 20 wt % to 30 wt %. 3,3'-DDS is the preferred curing agent. It preferably used as the sole curing agent in amounts ranging from 24 to 28 weight percent based on the total weight of the uncured resin. Small amounts (less than 5 wt %) of other curatives, such as 4,4'-DDS, may be included, if desired.

Accelerators may also be included to enhance or promote curing. Suitable accelerators are any of the urone compounds that have been commonly used in the curing of epoxy resins. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis [N',N'-dimethylurea] (e.g. Dyhard UR500 available from Degussa).

The uncured resin matrix of the present invention also includes a thermoplastic toughening agent. Any suitable thermoplastic polymers may be used as the toughening agent. Typically, the thermoplastic polymer is added to the resin mix as particles that are dissolved in the resin mixture by heating prior to addition of the curing agent. Once the thermoplastic agent is substantially dissolved in the hot matrix resin precursor (i.e. the blend of epoxy resins), the precursor is cooled and the remaining ingredients (curing agent and insoluble thermoplastic particles) are added and mixed with the cooled resin blend.

Exemplary thermoplastic toughening agents/particles include any of the following thermoplastics, either alone or in combination: poly sulfone, poly ethersulfone, polyetherimide, high performance hydrocarbon polymers, elastomers, and segmented elastomers.

A suitable toughening agent, by way of example, is particulate polyethersulfone (PES) that is sold under the trade name Sumikaexcel 5003P, and which is commercially available from Sumitomo Chemicals (New York, N.Y.). Alternatives to 5003P are Solvay polyethersulphone 105RP, or the non-hydroxyl terminated grades such as Solvay 1054P which is commercially available from Solvay Chemicals (Houston, Tex.). Densified PES particles may be used as the toughening agent. The form of the PES is not particularly important since the PES is dissolved during formation of the resin. Densified PES particles can be made in accordance with the teachings of U.S. Pat. No. 4,945,154, the contents of which are hereby incorporated by reference. Densified PES particles are also available commercially from Hexcel Corporation (Dublin, Calif.) under the trade name HRI-1. The average particle size of the toughening agent should be less than 100 microns to promote and insure complete dissolution of the PES in the matrix.

In the DEN/TRIF matrix resin, the toughening agent is present in the range 5 wt % to 15 wt %, based on the total weight of the uncured resin matrix. Preferably, the toughening agent is present in the range 7 wt % to 12 wt %. More preferably, the toughening agent is present in the range 8 wt % to 11 wt %.

In the DEN/TRIF/TETF matrix resin, the PES toughening agent is present in the range 5 wt % to 26 wt %, based on the total weight of the uncured resin. Preferably, the toughening agent is present in the range 7 wt % to 14 wt %. The preferred amount of PES for use in making resins with relatively low minimum viscosity (25-45 Poise) is from 7 to 9 weight percent based on the total weight of the uncured resin. The preferred amount of PES for use in making resins with relatively high minimum viscosity (55-75 Poise) is from 10 to 13 weight percent based on the total weight of the uncured resin.

The matrix resin may also include additional ingredients, such as performance enhancing or modifying agents provided they do not adversely affect the tack and out-life of the prepreg or the strength and damage tolerance of the cured composite part. The performance enhancing or modifying agents, for example, may be selected from core shell rubbers, flame retardants, wetting agents, pigments/dyes, UV absorbers, anti-fungal compounds, fillers, conducting particles, and viscosity modifiers.

Exemplary core shell rubber (CSR) particles are composed of a cross-linked rubber core, typically a copolymer of butadiene, and a shell composed of styrene, methyl methacrylate, glycidyl methacrylate and/or acrylonitrile. The core shell particles are usually provided as particles dispersed in an epoxy resin. The size range of the particles is typically from 50 to 150 nm. Suitable CSR particles are described in detail in U.S. Patent Publication US2007/0027233A1, the contents of which is hereby incorporated by reference. Preferred core shell particles are MX core-shell particles, which are available from Kane Ace (Pasadena, Tex.). A preferred core shell particle for inclusion in the DEN/TRIF matrix resin is Kane Ace MX-418. MX-418 is supplied as a 25 wt % suspension of core shell particles in a tetrafunctional epoxy resin. The core shell particles in MX-418 are polybutadiene (PBd) core shell particles which have an average particle size of 100 nanometers.

Suitable fillers include, by way of example, any of the following either alone or in combination: silica, alumina, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon nanotubes and carbon nanofibres. Metal-coated fillers may also be used, for example nickel coated carbon particles and silver coated copper particles.

Potato shaped graphite (PSG) particles are suitable conducting particles. The use of PSG particles in carbon fiber/epoxy resin composites is described in detail in U.S. Patent Publication No. US 2015/0179298 A1, the contents of which is hereby incorporated by reference. The PSG particles are commercially available from NGS Naturgraphit (Germany) as SG25/99.95 SC particles or from Nippon Power Graphite Company (Japan) as GHDR-15-4 particles. These commercially available PSG particles have average particle sizes of from 10-30 microns with the GHDR-15-4 particles having a vapor deposited coating of carbon on the outer surface of the PSG particles.

The uncured resin matrix may include small amounts (less than 5 wt % and preferably less than 1 wt %) of an additional epoxy or non-epoxy thermosetting polymeric resin. For DEN/TRIF/TETF matrix resins, the epoxy resin component contains at least 95 wt % DEN, TRIF and TETF and more preferably at least 99 wt % of the three epoxy resins. For DEN/TRIF matrix resins, the epoxy resin component contains at least 95 wt % DEN and TRIF and more preferably at least 99 wt % of the two epoxy resins. Suitable additional epoxy resins include difunctional epoxy resins, such as bisphenol A and bisphenol F type epoxy resins. Suitable non-epoxy thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins or any combination thereof. The additional thermoset resin, if any, is preferably selected from epoxy resins, cyanate ester resins, benzoxazine and phenolic resins.

The uncured resin is made in accordance with standard prepreg matrix resin processing. In general, the hydrocarbon novolac epoxy resin and other epoxy resin(s) are mixed together at room temperature to form a resin mix to which the thermoplastic toughening agent is added. This mixture is then heated to about 120° C. for about 1 to 2 hours to dissolve the thermoplastic toughening agent. The mixture is then cooled down to about 80° C. and the remainder of the ingredients (thermoplastic particle component, curing agent and other additive, if any) is mixed into the resin to form the final uncured resin matrix that is impregnated into the fiber reinforcement.

The uncured resin is applied to the fibrous reinforcement to form an uncured resin matrix in accordance with any of the known prepreg manufacturing techniques. The fibrous reinforcement may be fully or partially impregnated with the uncured resin. In an alternate embodiment, the uncured resin may be applied to the fiber fibrous reinforcement as a separate layer, which is proximal to, and in contact with, the fibrous reinforcement, but does not substantially impregnate the fibrous reinforcement. This type of partially impregnated prepreg is referred to as semipreg and is typically covered on both sides with a protective film and rolled up for storage and shipment at temperatures that are typically kept well below room temperature to avoid premature curing. The actual resin matrix is not formed until further processing of the semipreg. Any of the other prepreg manufacturing processes and storage/shipping systems may be used if desired.

The fibrous reinforcement of the prepreg may be selected from any fiberglass, carbon or aramid (aromatic polyamide) fibers. The fibrous reinforcement is preferably carbon fibers. Preferred carbon fibers are in the form of tows that contain from 3,000 to 50,000 carbon filaments (3K to 50K). Commercially available carbon fiber tows that contain 6,000 or 24,000 carbon filaments (6K or 24K) are preferred.

The uncured matrix resins of the present invention are particularly effective in providing laminates that have high strength properties and damage tolerance when the carbon tow contains from 6,000 to 24,000 filaments, the tensile strength is from 750 to 860 ksi, the tensile modulus is from 35 to 45 Msi, the strain at failure is 1.5 to 2.5%, the density is 1.6 to 2.0 g/cm$^3$ and the weight per length is from 0.2 to 0.6 g/m. 6K and 12K IM7 carbon tows (available from Hexcel Corporation) are preferred. IM7 12K fibers have a tensile strength of 820 ksi, the tensile modulus is 40 Msi, the strain at failure is 1.9%, the density is 1.78 g/cm$^3$ and the weight per length is 0.45 g/m. IM7 6K fibers have a tensile strength of 800 ksi, the tensile modulus is 40 Msi, the strain at failure is 1.9%, the density is 1.78 g/cm$^3$ and the weight per length is 0.22 g/m. IM7 fibers and carbon fibers with similar properties are generally considered to be intermediate modulus carbon fibers. IM8 carbon fibers, which are commercially available from Hexcel Corporation (Dublin, Calif.), are also a preferred type of medium modulus carbon fiber.

The fibrous reinforcement may comprise cracked (i.e. stretch-broken) or selectively discontinuous fibers, or continuous fibers. The use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg that is used to form sheet molding compound. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Les Avenieres, France).

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

The following exemplary DEN/TRIF/TETF resin formulations may be impregnated into a fibrous support to form a resin matrix in accordance with the present invention (all weight percentages are based on the total resin weight):

1) 9 wt % to 11 wt % dicyclopentadiene novolac epoxy resin (TACTIX®556); 21 wt % to 23 wt % triglycidyl-p-aminophenol (MY0510); 17 wt % to 19 wt % tetrafunctional epoxy (MY721); 10 wt % to 13 wt % polyethersulfone (5003P); 8 wt % to 10 wt % polyimide particles (P84HCM); 2 wt % to 4 wt % particles made from the condensation product of 3,3'-dimethyl-bis(4-aminocyclohexyl)-methane and 1,10-decane dicarboxylic acid (GRILAMID TR90); and 25 wt % to 28 wt % 3,3'-DDS as the curing agent.

2) 13 wt % to 16 wt % dicyclopentadiene novolac epoxy resin (TACTIX®556); 18 wt % to 20 wt % triglycidyl-p-aminophenol (MY0510); 17 wt % to 19 wt % tetrafunctional epoxy (MY721); 10 wt % to 13 wt % polyethersulfone (5003P); 8 wt % to 10 wt % polyimide particles (P84HCM); 2 wt % to 4 wt % particles made from the condensation product of 3,3'-dimethyl-bis(4-aminocyclohexyl)-methane and 1,10-decane dicarboxylic acid (GRILAMID TR90); and 25 wt % to 28 wt % 3,3'-DDS as the curing agent.

3) 16 wt % to 18 wt % dicyclopentadiene novolac epoxy resin (TACTIX®556); 14 wt % to 16 wt % triglycidyl-p-aminophenol (MY0510); 17 wt % to 19 wt % tetrafunctional epoxy (MY721); 10 wt % to 13 wt % polyethersulfone (5003P); 5 wt % to 7 wt % polyimide particles (P84HCM); 5 wt % to 7 wt % particles made from the condensation product of 3,3'-dimethyl-bis(4-aminocyclohexyl)-methane and 1,10-decane dicarboxylic acid (GRILAMID TR90); and 25 wt % to 28 wt % 3,3'-DDS as the curing agent.

4) 13 wt % to 16 wt % dicyclopentadiene novolac epoxy resin (TACTIX®556); 19 wt % to 21 wt % triglycidyl-p-aminophenol (MY0510); 18 wt % to 20 wt % tetrafunctional epoxy (MY721); 7 wt % to 9 wt % polyethersulfone (5003P); 2 wt % to 4 wt % polyimide particles (P84HCM); 8 wt % to 10 wt % particles made from the condensation product of 3,3'-dimethyl-bis(4-aminocyclohexyl)-methane and 1,10-decane dicarboxylic acid (GRILAMID TR90); and 25 wt % to 28 wt % 3,3'-DDS as the curing agent.

5) 9 to 11 wt % dicyclopentadiene novolac epoxy resin (TACTIX®556); 21 wt % to 23 wt % triglycidyl-p-aminophenol (MY0510); 19 wt % to 22 wt % tetrafunctional epoxy (MY721); 7 wt % to 9 wt % polyethersulfone (5003P); 2 wt % to 4 wt % polyimide particles (P84HCM); 8 wt % to 10 wt % particles made from the condensation product of 3,3'-dimethyl-bis(4-aminocyclohexyl)-methane and 1,10-decane dicarboxylic acid (GRILAMID TR90); and 26 wt % to 29 wt % 3,3'-DDS as the curing agent.

With respect to the DEN/TRIF matrix resin embodiments of the invention, a preferred exemplary DEN/TRIF matrix resin includes from 29 wt % to 33 wt % triglycidyl-m-aminophenol (MY0600); from 20 wt % to 24 wt % hydrocarbon novolac epoxy resin (TACTIX 556); from 7 wt % to 11 wt % polyethersulfone (5003P) as a toughening agent; from 2 wt % to 7 wt % crosslinked polyamide 12 particles (ORGASOL 2009); from 9 wt % to 13 wt % polyamide 11 particles (Rislan PA11) where the weight ratio of polyamide 11 particles to crosslinked polyamide 12 particles is from 2.5:1.0 to 3.0:1 and preferably 2.7:1 to 2.8:1; and from 20 wt % to 26 wt % 4,4'-DDS as the curing agent.

Another preferred DEN/TRIF matrix resin includes from 19 wt % to 23 wt % triglycidyl-m-aminophenol (MY0600); from 14 wt % to 18 wt % hydrocarbon novolac epoxy resin (TACTIX 556); from 7 wt % to 11 wt % polyethersulfone (5003P) as a toughening agent; from 9 wt % to 13 wt % polyamide 11 particles (Rislan PA11); from 18-22 wt % core shell particles (MX-418); and from 21 wt % to 26 wt % 4,4'-DDS as the curing agent.

The prepreg may be molded using any of the standard techniques used to form composite parts. Typically, one or more layers of prepreg are placed in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The composite material may be cured using a method selected from microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful in many other high performance composite applications including automotive, rail and marine applications where high compressive strength, interlaminar fracture toughness and resistance to impact damage are needed.

Examples 1-7, which are examples of practice with respect to the DEN/TRIF/TETF matrix resin embodiment of the invention, are as follows:

Example 1

A preferred exemplary resin formulation in accordance with the present invention is set forth in TABLE 1. A matrix resin was prepared by mixing the epoxy ingredients at room temperature with the polyethersulfone to form a resin blend that was heated to 120° C. for 60 minutes to completely dissolve the polyethersulfone. The mixture was cooled to 80° C. and the rest of the ingredients added and mixed in thoroughly.

TABLE 1

| Ingredient | Amount (Wt %) |
|---|---|
| Hydrocarbon epoxy novolac resin (TACTIX ® 556) | 10.0 |
| Trifunctional para-glycidyl amine (MY0510) | 21.9 |
| N,N,N',N'-tetraglycidyl-4,4'-diaminodiphenyl methane (MY721) | 18.2 |
| Thermoplastic Toughening Agent (polyether sulfone - 5003P) | 11.5 |
| Polyimide Particles (P84HCM) | 3.0 |
| Polyamide Particle (TR90) | 9.0 |
| Aromatic diamine curing agent (3,3-DDS) | 26.4 |

Exemplary prepreg was prepared by impregnating one or more layers of unidirectional carbon fibers with the resin formulation of TABLE 1. The unidirectional carbon fibers (12K IM8 available from Hexcel Corporation) were used to make a prepreg in which the matrix resin amounted to 35 weight percent of the total uncured prepreg weight and the fiber areal weight was 192 grams per square meter (gsm). 26-ply laminates were prepared using standard prepreg fabrication procedures. The laminates were cured in an autoclave at 177° C. for about 2 hours. The cured laminates were tested to determine interlaminar fracture toughness.

G2c is a standard test that provides a measure of the interlaminar fracture toughness of a cured laminate. G2c was determined as follows. A 26-ply unidirectional laminate was cured with a 3 inch fluoroethylene polymer (FEP) film inserted along one edge, at the mid-plane of the layup, perpendicular to the fiber direction to act as a crack starter. The laminate was cured for 2 hours at 177° C. in an autoclave and gave a nominal thickness of 3.8 mm. Consolidation was verified by C-scan. G2c samples were machined from the cured laminate. G2c was tested at room temperature in accordance with BSS7320. The G2c values listed below are the average of the first and second cracks observed during the testing in accordance with BSS7320.

The G2c of the cured 26-ply laminate was 10.22. Open hole compression (OHT) and open hole compression (OHC) were also measured according to standard procedures at room temperature and found to be above acceptable limits for structural parts.

Example 2

An exemplary prepreg having a DEN/TRIF/TETR resin matrix with the formula set forth in TABLE 2 was prepared in the same manner as Example 1.

TABLE 2

| Ingredient | Amount (Wt %) |
|---|---|
| Hydrocarbon epoxy novolac resin (TACTIX ® 556) | 14.10 |
| Trifunctional para-glycidyl amine (MY0510) | 19.15 |
| N,N,N',N'-tetraglycidyl-4,4'-diaminodiphenyl methane (MY721) | 17.85 |
| Thermoplastic Toughening Agent (polyether sulfone - 5003P) | 11.50 |
| Polyimide Particles (P84HCM) | 3.0 |
| Polyamide Particle (TR90) | 9.0 |
| Aromatic diamine curing agent (3,3-DDS) | 25.40 |

26-ply laminates were prepared, cured and tested for G2c at room temperature in the same manner as Example 1. The G2c was 13.16. The OHT and OHC were both also above acceptable limits for structural parts.

Example 3

An exemplary prepreg was prepared in the same manner as Example 1, except that a DEN/TRIF/TETF resin formulation, as set forth in TABLE 3, was used as the prepreg resin matrix.

TABLE 3

| Ingredient | Amount (Wt %) |
| --- | --- |
| Hydrocarbon epoxy novolac resin (TACTIX ® 556) | 17.0 |
| Trifunctional para-glycidyl amine (MY0510) | 14.9 |
| N,N,N',N'-tetraglycidyl-4,4'-diaminodiphenyl methane (MY721) | 18.2 |
| Thermoplastic Toughening Agent (polyether sulfone - 5003P) | 11.5 |
| Polyimide Particles (P84HCM) | 6.0 |
| Polyamide Particle (TR90) | 6.0 |
| Aromatic diamine curing agent (3,3-DDS) | 26.4 |

26-ply laminates were prepared, cured and tested for G2c at room temperature in the same manner as Example 1. The G2c was 10.47. The OHT and OHC were both also above acceptable limits for structural parts.

Example 4

An exemplary prepreg was prepared in the same manner as Example 1, except that a DEN/TRIF/TETF matrix resin formulation, as set forth in TABLE 4, was used as the prepreg resin matrix.

TABLE 4

| Ingredient | Amount (Wt %) |
| --- | --- |
| Hydrocarbon epoxy novolac resin (TACTIX ® 556) | 17.0 |
| Trifunctional meta-glycidyl amine (MY0610) | 14.9 |
| N,N,N',N'-tetraglycidyl-4,4'-diaminodiphenyl methane (MY721) | 18.2 |
| Thermoplastic Toughening Agent (polyether sulfone - 5003P) | 11.5 |
| Polyimide Particles (P84HCM) | 6.0 |
| Polyamide Particle (TR90) | 6.0 |
| Aromatic diamine curing agent (3,3-DDS) | 26.4 |

26-ply laminates were prepared, cured and tested for G2c at room temperature in the same manner as Example 1. The G2c was 9.15. The OHT and OHC were both also above acceptable limits for structural parts.

Example 5

An exemplary prepreg was prepared in the same manner as Example 1, except that a resin formulation in accordance with the present invention, as set forth in TABLE 5, was used as the prepreg resin matrix.

TABLE 5

| Ingredient | Amount (Wt %) |
| --- | --- |
| Hydrocarbon epoxy novolac resin (TACTIX ® 556) | 10.0 |

TABLE 5-continued

| Ingredient | Amount (Wt %) |
| --- | --- |
| Trifunctional meta-glycidyl amine (MY0510) | 21.9 |
| N,N,N',N'-tetraglycidyl-4,4'-diaminodiphenyl methane (MY721) | 18.2 |
| Thermoplastic Toughening Agent (polyether sulfone - 5003P) | 11.5 |
| Polyimide Particles (P84HCM) | 6.0 |
| Polyamide Particle (TR90) | 6.0 |
| Aromatic diamine curing agent (3,3-DDS) | 26.4 |

26-ply laminates were prepared, cured and tested for G2c at room temperature in the same manner as Example 1. The G2c was 9.50. The OHT and OHC were both also above acceptable limits for structural parts.

Example 6

An exemplary prepreg was prepared in the same manner as Example 1, except that a resin formulation in accordance with the present invention, as set forth in TABLE 6, was used as the prepreg resin matrix.

TABLE 6

| Ingredient | Amount (Wt %) |
| --- | --- |
| Hydrocarbon epoxy novolac resin (TACTIX ® 556) | 14.75 |
| Trifunctional para-glycidyl amine (MY0510) | 20.03 |
| N,N,N',N'-tetraglycidyl-4,4'-diaminodiphenyl methane (MY721) | 18.67 |
| Thermoplastic Toughening Agent (polyether sulfone - 5003P) | 8.0 |
| Polyimide Particles (P84HCM) | 3.0 |
| Polyamide Particle (TR90) | 9.0 |
| Aromatic diamine curing agent (3,3-DDS) | 26.56 |

26-ply laminates were prepared, cured and tested for G2c at room temperature in the same manner as Example 1. The G2c was 9.31. The OHT and OHC were both also above acceptable limits for structural parts.

Example 7

An exemplary prepreg was prepared in the same manner as Example 1, except that a resin formulation in accordance with the present invention, as set forth in TABLE 7, was used as the prepreg resin matrix.

TABLE 7

| Ingredient | Amount (Wt %) |
| --- | --- |
| Hydrocarbon epoxy novolac resin (TACTIX ® 556) | 10.0 |
| Trifunctional para-glycidyl amine (MY0510) | 22.0 |
| N,N,N',N'-tetraglycidyl-4,4'-diaminodiphenyl methane (MY721) | 20.5 |
| Thermoplastic Toughening Agent (polyether sulfone - 5003P) | 8.0 |
| Polyimide Particles (P84HCM) | 3.0 |
| Polyamide Particle (TR90) | 9.0 |
| Aromatic diamine curing agent (3,3-DDS) | 27.5 |

26-ply laminates were prepared, cured and tested for G2c at room temperature in the same manner as Example 1. The G2c was 7.30. The OHT and OHC were both also above acceptable limits for structural parts.

Comparative Examples 1-7

Comparative prepregs and laminates with respect to the DEN/TRIF/TETF matrix resin embodiment were prepared, cured and tested in the same manner as Example 1, except that the resin formulations were as set forth in TABLE 8. The amounts listed in TABLE 8 are weight percent of the total resin mixture. 26-ply laminates were prepared, cured and tested for G2c at room temperature in the same manner as Example 1. The G2c results are listed in the table.

TABLE 8

| Ingredient | C1 | C2 | C3 | C4 | C5 | C6 | C7 |
|---|---|---|---|---|---|---|---|
| TACTIX ® 556 | 10.0 | 10.0 | 14.1 | 10.0 | 5.00 | 14.75 | 5.00 |
| MY0510 | 21.9 | 21.9 | 19.16 | 22.00 | 24.08 | 20.03 | 24.08 |
| MY721 | 18.2 | 18.2 | 17.89 | 20.50 | 22.44 | 18.67 | 22.44 |
| 5003P | 11.5 | 11.5 | 11.5 | 8.0 | 8.0 | 8.0 | 8.0 |
| P84HCM | 12.0 | 0 | 9.0 | 0 | 3.0 | 0 | 0 |
| TR90 | 0 | 12.0 | 3.0 | 12.0 | 9.0 | 12.0 | 12.0 |
| 3,3-DDS | 26.4 | 26.4 | 25.4 | 27.51 | 28.49 | 26.56 | 28.49 |
| G2c | 4.68 | 9.97 | 7.12 | 5.31 | 4.29 | 8.36 | 2.64 |

The viscosity of the resin formulation should be such that the prepreg resin formulation can be suitably impregnated or otherwise applied to the fibrous reinforcement using accepted prepreg formation processes. The viscosity profile of the resin provides a guide as to the suitability of a resin formulation for use as a prepreg resin. The viscosity profile is determined by raising the temperature of the resin from room temperature at a rate of 2° C. per minute and monitoring the viscosity of the resin. As the resin is heated, the viscosity typically decreases to a minimum and then increases as polymerization progresses. The minimum viscosity of the resin and the temperature at which this minimum viscosity is reached provides an indication of the suitability of the resin for a given prepreg process. When the term "minimum viscosity" is used herein, it means the minimum viscosity that is measured during determination of the viscosity profile for the resin.

In many prepreg manufacturing processes, it is desirable that the minimum viscosity be such that adequate resin flow occurs during formation of the prepreg to ensure complete impregnation of the fiber reinforcement. The desired minimum viscosity for the prepreg resin in such processes depends upon a number of factors including the desired degree of impregnation, impregnation temperature and pressure, the method used to accomplish impregnation and the type of fibrous reinforcement.

The preferred minimum viscosity of the prepreg resin is in the range of from 55 to 75 Poise (P) for those prepreg processes that require a relatively high viscosity prepreg resin. For prepreg processes that require a relatively low viscosity prepreg resin, the preferred minimum viscosity of the prepreg resin is in the range of from 25 to 45 P. It was found that amounts of PES in the range of 10-13 weight percent provides prepreg resins in accordance with the present invention that are in the higher minimum viscosity range. PES amounts in the range of 7-9 weight percent provide prepreg resins in accordance with the present invention that are in the lower minimum viscosity range.

The viscosity profiles were determined for Examples 1-7 and Comparative Examples 1-7. The minimum viscosity and temperature at which the minimum viscosity was reached is set forth in TABLE 9. The amount of PES and TACTIX 556 resin in the formulation along with the G2c values are also tabulated in the table.

TABLE 9

| | Minimum Viscosity Poise (P) | Temperature at Minimum Viscosity (° C.) | G2c | PES WT % | TACTIX 556 |
|---|---|---|---|---|---|
| Example 1 | 61.34 | 137.0 | 10.22 | 11.5 | 10.0 |
| Example 2 | 66.60 | 130.8 | 13.16 | 11.5 | 14.1 |
| Example 3 | 64.8 | 136.4 | 10.47 | 11.5 | 17.0 |
| Example 4 | 70.6 | 136.2 | 9.15 | 11.5 | 17.0 |
| Example 5 | 56.3 | 134.5 | 9.50 | 11.5 | 10.0 |
| Example 6 | 34.4 | 124.0 | 9.31 | 8.0 | 14.75 |
| Example 7 | 32.55 | 124.1 | 7.30 | 8.0 | 10.0 |
| Comp. Ex. 1 | — | — | 4.68 | 11.5 | 10.0 |
| Comp. Ex. 2 | 85.5 | 130.7 | 9.97 | 11.5 | 10.0 |
| Comp. Ex. 3 | 55.9 | 136.4 | 7.12 | 11.5 | 14.1 |
| Comp. Ex. 4 | 41.23 | 118.9 | 5.13 | 8.0 | 10.0 |
| Comp. Ex. 5 | 30.1 | 122.3 | 4.29 | 8.0 | 5.0 |
| Comp. Ex. 6 | 57.1 | 116.3 | 8.36 | 8.0 | 14.75 |
| Comp. Ex. 7 | 47.8 | 116.1 | 2.64 | 8.0 | 5.0 |

Examples 1-5 are exemplary of DEN/TRIF/TETF resins that have a minimum viscosity which falls within the above-mentioned high viscosity range. The DEN/TRIF/TETF resin formulation of Example 1 is preferred because it provides an unexpectedly high G2c of over 10 when using only 10.0 weight percent TACTIX 556 resin in combination with 9.0 weight percent TR90 polyamide particles and 3.0 weight percent P84 polyimide particles. Examples 3 and 4, which use 17.0 weight percent TACTIX 556 resin in combination with 6.0 weight percent TR90 polyamide particles and 6.0 weight percent P84 polyimide particles, also unexpectedly achieve rather high G2c values while keeping the minimum viscosity within the desired high viscosity range.

The DEN/TRIF/TETF resin formulation of Example 2 is particularly preferred because it provides an increase of G2c up to 13.16 when 14.10 weight percent TACTIX 556 resin is used in combination with 9.0 weight percent TR90 polyamide particles and 3.0 weight percent P84 polyimide particles. Such a high G2c value (13.16) is particularly unexpected.

The high values for G2c that are obtained when TACTIX 556 resin is combined with TR90 polyamide particles and P84 polyimide particles, as set forth above, is unexpected because Comparative Example 1 shows that the use of P84 polyimide particles alone (C1) provides a relatively low G2c of only 4.68. Comparative Example 2 shows that the use of TR90 polyamide particles alone (C2) provides a much higher G2c of 9.97. It is unexpected that combinations of P84 polyimide particles and TR90 polyamide particles are capable of providing higher G2c values than can be achieved using either type of particle alone.

In view of Comparative Examples 1 and 2, Comparative Example 3 shows an expected decrease in G2c (7.12) when 9.0 weight percent P84 polyimide particles are combined with 3.0 weight percent TR90 polyamide particles. In view of Comparative Examples 1-3, it is unexpected that adding any amount of P84 polyimide particles to a thermoplastic particle component made up of TR90 polyamide particles would synergistically increase the G2c values to at least 10 as shown in Examples 1-3. It is particularly unexpected that a G2c of 13.6 could be achieved when the amount of TACTIX 556 resin is increased from 10.0 to 14.1 weight percent as shown in Examples 1 and 2.

The high G2c values that are obtained with the DEN/TRIF/TETF matrix resin formulations according to Examples 1-5 is accomplished while keeping the minimum viscosity of the resins at between 25 and 75 Poise. As shown in Comparative Example 2, the use of TR90 polyamide particles alone does provide a relatively high G2c of 9.97. However, the minimum viscosity is 85.5 Poise, which is above the desired high viscosity range of 55-75 Poise.

Examples 6-7 are exemplary of DEN/TRIF/TETF resins that have a minimum viscosity which falls within the above-mentioned low viscosity range. The lower viscosity levels provided by using lower amounts (7-9 wt %) of PES (See Example 6-7 and Comparative Examples 4-7) also results in a decrease in the G2c levels of the cured laminates. Even so, the resin formulations of Example 6-7 provide an unexpectedly high G2c. A comparison of Example 6 to Comparative Example 6 (14.75 wt % TACTIX 556 resin) shows that the G2c is synergistically increased from 8.36 to 9.31 when the thermoplastic particle component is changed from 12.0 wt % TR90 polyamide particles to a mixture of 9.0 wt % TR90 polyamide particles and 3.0 wt % P84 polyimide particles. In addition, a comparison of Example 7 to Comparative Example 4 (10.0 wt % TACTIX 556 resin) shows that the G2c is synergistically increased from 5.13 to 7.30 when the thermoplastic particle component is changed from 12.0 wt % TR90 polyamide particles to a mixture of 9.0 wt % TR90 polyamide particles and 3.0 wt % P84 polyimide particles.

The observed synergistic effect provided by the addition of polyimide particles to TR90 polyamide particles in a DEN/TRIF/TETF matrix resin is not expected to occur unless the thermoplastic particle component contains at least 15 weight percent polyimide particles, based on the total weight of the thermoplastic component, with the remainder of the thermoplastic particle component being TR90 polyamide particles. The synergistic effect is expected to end when the thermoplastic particle component contains more than 70 weight percent polyimide particles, based on the total weight of the thermoplastic component, with the remainder of the thermoplastic particle component being TR90 polyamide particles. The maximum synergistic effect is provided when the thermoplastic particle component contains from 20 to 30 weight percent polyimide particles, based on the total weight of the thermoplastic component, with the remainder of the thermoplastic particle component being TR90 polyamide particles.

The inclusion of TACTIX 556 resin in the epoxy resin component of a DEN/TRIF/TETF matrix resin provides a substantial increase in the G2c fracture resistance. Examples 6 and 7 show that the G2c goes from 9.31 to 7.30 when the amount of TACTIX 556 resin is reduced from 14.75 to 10.0 weight percent. Comparative Example 5 shows that the G2c drops down to a low value 4.29 when the amount of TACTIX 556 resin is reduced to 5.0 weight percent. Comparative Examples 4 and 6-7 show that a similar drop in G2c occurs when the amount of TACTIX 556 resin is reduced in comparative resins that contain only TR90 polyamide particles as the thermoplastic particle component. Accordingly, it is preferred that the amount of hydrocarbon epoxy novolac resin present in the DEN/TRIF/TETF matrix resin formulations of the present invention be at least 8 weight percent, based on the total weight of the resin.

Examples 8-23, which are examples of practice with respect to the DEN/TRIF matrix resin embodiment of the invention, are as follows:

Example 8

An exemplary DEN/TRIF resin formulation in accordance with the present invention is set forth a TABLE 10. An uncured matrix resin was prepared by mixing the epoxy ingredients at room temperature with the polyethersulfone to form a resin blend that was heated to 120° C. for 60 minutes to completely dissolve the polyethersulfone. The mixture was cooled to 80° C. and the rest of the ingredients were added and mixed in thoroughly in the same manner as Examples 1-7.

TABLE 10

| Ingredient | Amount (Wt %) |
|---|---|
| dicyclopentadiene novolac epoxy resin (TACTIX 556) | 21.92 |
| Trifunctional meta-glycidyl amine (MY0600) | 31 |
| Thermoplastic Toughening Agent (polyether sulfone - 5003P) | 15.69 |
| Crosslinked PA12 Particles (ORGASOL 2009) | 9.00 |
| Non-crosslinked - PA11 Particles (Rislan 11) | 11.00 |
| Aromatic diamine curing agent (4,4'-DDS) | 23.09 |

Exemplary prepreg was prepared by impregnating a layer of unidirectional carbon fibers with the resin formulation of TABLE 10 to form a prepreg composed of reinforcing fibers and an uncured resin matrix. The unidirectional carbon fibers were 12K IM7. The uncured resin matrix amounted to 35 weight percent of the total uncured prepreg weight and the fiber areal weight of the uncured prepreg was 145 grams per square meter (gsm).

The prepreg was used to form a laminate in the same manner as Examples 1-7. The laminate was cured in an autoclave at 177° C. for about 2 hours to form a cured test laminate. The cured test laminate was divided into test samples that were examined to determine open hole compressive strength (OHC) and open hole tensile strength (OHT).

The OHC and OHT test samples were examined under dry conditions (relative humidity of 10% to 50%) at room temperature (21 to 24° C.). OHC was tested in accordance with D6-83079-71 Type II Class 1. OHT was tested in accordance with D6-83079-62 Type I Class 1.

Cured test samples were also subjected to standard tests to determine their tolerance to damage (CAI). Compression after Impact (CAI) was determined using a 270 in-lb impact against a 32-ply quasi-isotropic laminate. The specimens were machined, impacted and tested in accordance with Boeing test method BSS7260 per BMS 8-276. Values are normalized to a nominal cured laminate thickness of 0.18 inch.

The cured test samples were also subjected to testing in accordance with ASTM D5528 in the same manner as Examples 1-7 in order to determine G1c and G2c.

When the terms "OHT", "OHC", "CAI", "G1c" and G2c" are used herein to define a property exhibited by a cured laminate, the terms mean the property as measured by the above described testing procedures.

Additional exemplary DEN/TRIF matrix resin formulations (Examples 9-23) are set forth in TABLES 11-13. The exemplary DEN/TRIF matrix resin formulations were used to make prepreg that was cured and tested in the same manner as Examples 1-8, except that Examples 22 and 23 used 12K IM8 carbon fibers rather than 12K IM7 fibers. The results of OHT, OHC, CAI, G1c and G2c testing with respect to Examples 8-23, which were conducted as described above, are set forth in TABLES 11-13.

TABLE 11

| Ingredient | Ex 8 | Ex 9 | Ex 10 | Ex 11 | Ex 12 | Ex 13 |
|---|---|---|---|---|---|---|
| TACTIX ® 556 | 21.92 | 22.51 | 21.92 | 21.92 | 21.92 | 22.95 |
| MY0610 | 31 | 31.8 | 31 | 31 | 31 | 32.46 |
| PES (5003P) | 9.00 | 7.00 | 9.00 | 9.00 | 9.00 | 9.42 |

TABLE 11-continued

| Ingredient | Ex 8 | Ex 9 | Ex 10 | Ex 11 | Ex 12 | Ex 13 |
|---|---|---|---|---|---|---|
| RISLAN 11 | 11.00 | 11.00 | 11.00 | 12.00 | 13.00 | 11.00 |
| ORGASOL 2009 | 4.00 | 4.00 | 4.00 | 3.00 | 2.00 | 0 |
| 3,3'-DDS | 0 | 0 | 23.09 | 0 | 0 | 0 |
| 4,4'-DDS | 23.09 | 23.69 | 0 | 23.09 | 23.09 | 24.17 |
| OHT | 166.1 | 160.2 | 153.0 | — | — | 156.7 |
| OHC | 80.1 | 78.56 | 80.3 | — | — | — |
| CAI | 54.4 | 53.68 | 53.2 | — | — | 51.17 |
| G1c | 3.61 | 3.37 | 3.52 | 3.57 | 3.68 | 3.03 |
| G2c | 15.70 | 14.93 | 15.38 | 15.55 | 15.67 | 12.55 |

TABLE 12

| Ingredient | Ex 14 | Ex 15 | Ex 16 | Ex 17 | Ex 18 | Ex 19 |
|---|---|---|---|---|---|---|
| TACTIX ® 556 | 22.69 | 22.43 | 22.18 | 21.92 | 14.87 | 21.92 |
| MY0610 | 32.09 | 31.73 | 31.36 | 31 | 38.31 | 31 |
| PES (5003P) | 9.32 | 9.21 | 9.11 | 9.00 | 9.32 | 9.00 |
| RISLAN 11 | 12.00 | 13.00 | 14.00 | 15.00 | 0 | 0 |
| ORGASOL 2009 | 0 | 0 | 0 | 0 | 0 | 0 |
| Polyamide TR90 | 0 | 0 | 0 | 0 | 12.00 | 0 |
| Polyamide CX7323 | 0 | 0 | 0 | 0 | 0 | 15.00 |
| 4,4'-DDS | 23.90 | 23.63 | 23.36 | 23.09 | 25.5 | 23.09 |
| OHT | 158.8 | 161.6 | 159.6 | 160.1 | 140.7 | 163.2 |
| OHC | — | — | — | — | — | — |
| CAI | 51.1 | 52.74 | 53.19 | 55.22 | — | 50.06 |
| G1c | 3.09 | 3.11 | 3.10 | 3.29 | 3.12 | 4.12 |
| G2c | 15.72 | 14.09 | 17.93 | 14.70 | 13.69 | 13.11 |

TABLE 13

| Ingredient | Ex 20 | Ex 21 | Ex 22 | Ex 23 | C8 | C9 |
|---|---|---|---|---|---|---|
| TACTIX ® 556 | 15.56 | 0 | 21.92 | 14.37 | 14.71 | 14.00 |
| XD-1000-2L | 0 | 23.01 | 0 | 0 | 0 | 0 |
| MY0610 | 21.05 | 30.33 | 31.00 | 37.00 | 0 | 0 |
| MY0510 | 0 | 0 | 0 | 0 | 37.00 | 0 |
| MY721 | 0 | 0 | 0 | 0 | 0 | 30.00 |
| Bis A Epoxy | 0 | 0 | 0 | 0 | 0 | 4.53 |
| Bis F Epoxy | 0 | 0 | 0 | 0 | 0 | 5.67 |
| PES (5003P) | 9.00 | 9.00 | 9.00 | 9.00 | 9.00 | 9.00 |
| RISLAN 11 | 11.00 | 15.00 | 11.00 | 11.00 | 6.00 | 11.00 |
| ORGASOL 2009 | 0 | 0 | 4.00 | 4.00 | 6.00 | 6.00 |
| Core-shell MX-418 | 20.00 | 0 | 0 | 0 | 0 | 0 |
| PSG particles | 0 | 0 | 0 | 0 | 3.00 | 0 |
| 4,4'-DDS | 23.39 | 22.66 | 23.09 | 24.63 | 24.29 | 21.80 |
| OHT | 170.2 | 160.4 | 166.9 | 151 | 135 | 145.8 |
| OHC | — | — | 73.42 | 70.77 | 75.79 | 67.82 |
| CAI | — | 55.29 | 53.01 | — | — | — |
| G1c | 3.16 | 3.41 | 3.54 | — | — | — |
| G2c | 12.84 | 15.52 | 13.22 | — | — | — |

The matrix resins formulations for Examples 8-23, as set for the in TABLES 11-13 are exemplary of suitable DEN/TRIF matrix resins in accordance with the present invention. Many other possible similar formulations are possible in accordance with the present invention provided that the cured laminate made using the DEN/TRIF resin formulation exhibits the following properties: 1) OHT of at least 140, preferably at least 150 and most preferably at least 160; 2) OHC of at least 70, preferably at least 75 and most preferably at least 80; 3) CAI of at least 45, preferably at least 50 and most preferably at least 55; 4) G1c of at least 3.0, preferably at least 3.2 and most preferably at least 3.5; and 3) G2c of at least 12.0, preferably at least 14.0 and most preferred at least 15.0.

DEN/TRIF matrix resin formulations which correspond to Example 1 are preferred resin formulations because they provide very high fracture tolerance (G1c and G2c) while unexpectedly maintaining relatively high CAI, OHT and OHC.

DEN/TRIF matrix resin formulations which correspond to Example 20 are also preferred resin formulations because the inclusion of core shell particles in a DEN/TRIF-type formulation was found to provide high OHT and acceptable fracture tolerance, as measured by G2c. In addition, of all of the DEN/TRIF examples tested, the R-curve fracture toughness of Example 20, as measured by crack growth resistance (R-curve) analysis, was unexpectedly better than the others. R-curve analysis is a known type of test procedure that is commonly used for investigating the fracture mechanics of laminates and other materials. ASTM Standard E561 is an example of a commonly used R-curve analysis procedure with many variations of this procedure commonly in use. The laminates made using DEN/TRIF exemplary formulations were tested using an R-curve testing procedure that is similar to ASTM E561. Example 20 was the only laminate that had a rising R-curve. A rising R-curve, as opposed to a negative or flat R-curve, is considered indicative of a high level of crack growth resistance and fracture toughness.

The DEN/TRIF matrix resin formulations are combined with an intermediate modulus carbon fiber, such as IM7 or IM8, to form prepreg that can be used to form uncured laminates that are curable to form cured laminates that have properties which fall within the above ranges. To verify that each DEN/TRIF exemplary matrix resin meets the requirements of the present invention, it is necessary to test each laminate to confirm that it meets or exceeds the OHT, OHC, CAI, G1c and G2c limits, as set forth above.

Comparative Example 8 (see TABLE 13) involves the use of MY0510 in place of MY0610 in the resin component of a DEN/TRIF matrix resin. Comparative Example 8 was prepared and tested in the same manner as Examples 22-23. The OHT for Comparative Example 8 was 135. This is below the threshold OHT of 140 which is required for the matrix resin to be acceptable in accordance with the present invention. A small amount of PSG particles are present in the matrix resin of Comparative Example 8. PSG particles are not present in Examples 22-23. The inclusion of a small amount of PSG particles is expected to have a relatively small effect on OHT. It is believed that the relatively low OHT for Comparative Example 8 is at least partly due to the use of MY0510 in place of MY0610. Accordingly, it is preferred that triglycidyl-meta-aminophenol (MY0610) resin, rather than triglycidyl-para-aminophenol (MY0510) resin, be used in DEN/TRIF matrix resin embodiments.

The negative effect of using MY0510 instead of MY0610 in the DEN/TRIF matrix resin embodiments is contrary to the positive effect that is observed when MY0510 is used instead of MY0610 in the DEN/TRIF/TETF matrix resin embodiments. As shown by a comparison of Example 3 with Example 4, the G2c dropped from 10.47 to 9.15 when MY0610 was used in place of MY0510 in a DEN/TRIF/TETF matrix resin. Accordingly, it is preferred that triglycidyl-para-aminophenol (MY0510) resin, rather than triglycidyl-metal-aminophenol (MY0610) resin, be used in DEN/TRIF/TETF matrix resin embodiments.

Comparative Example 9 (see TABLE 13) involves the use of approximately 10 wt % difunctional epoxy resins (Bisphenol A and Bisphenol F epoxy resins) in combination with TACTIX®556 and MY721 in the epoxy resin component. The resulting OHC was 67.82, which is below the threshold of 70 for laminates made using DEN/TRIF matrix resin formulations. Accordingly, the inclusion of difunctional epoxy resins in either matrix resin embodiment should be kept below 5 wt % and preferably below 1 wt %, as discussed above.

The resins described above in accordance with the present invention are particularly well suited for use in making prepreg that can be used in the production of large aerospace vehicle structures, such as rocket booster casings. An exemplary space vehicle is shown at 100 in FIG. 3. The space vehicle includes a rocket booster 102 and a spacecraft 104. A main structural component of the rocket booster is a cylindrical outer casing 106, as shown in FIG. 4. A typical rocket booster casing will have an exterior diameter that ranges from 2 to 5 meters with the casing wall being from 0.5 to 5 cm thick. The length of a typical rocket booster casing will range from 50 to 100 meters. An exemplary large rocket boosting casing will have an external diameter of 3.5 to 4.0 meters, a casing thickness of 0.8 to 1.2 cm and a length of 65 to 75 meters.

Rocket booster casings are made by laying up multiple layers of prepreg on a cylindrical mold to provide an uncured cylindrical laminate that contains numerous layers of prepreg. The large size of the uncured cylindrical laminate makes it very difficult to cure the laminate in an autoclave. Accordingly, curing of the uncured cylindrical laminate to form the rocket booster casing is typically accomplished out-of-autoclave using known vacuum bagging techniques, such as those commonly used in making wind turbine blades.

As mentioned previously, semipreg is a type of prepreg in which the matrix resin is present on the surface of the reinforcing fibers (fibrous layer) as a film or layer of uncured resin that only partially impregnates the fibrous layer. Semipreg is a preferred type of prepreg for use in making rocket booster casings because the dry portion of the fibrous layers that are not impregnated with uncured resin were found to provide pathways for gases to escape during curing of the cylindrical laminate out-of-autoclave. It was discovered that providing such pathways for gases to escape from the laminate during curing is an effective way to avoid the formation of voids in the rocket booster casing. Void formation is a particular problem when large laminates are cured outside of an autoclave (out-of-autoclave) using relatively low-pressure vacuum bagging procedures.

Figure 6:
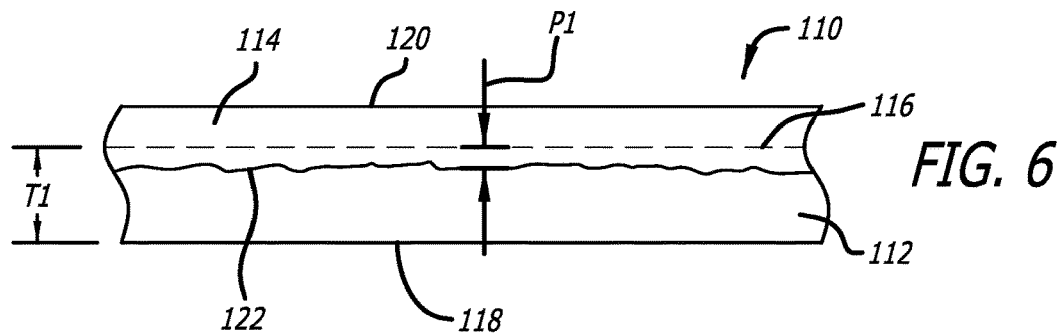
FIG. 6 is a simplified representation of an exemplary semipreg in which the resin matrix has been applied as a single film or layer.

An exemplary semipreg in accordance with the present invention is shown at 110 in FIG. 6. The semipreg 110 includes reinforcement fibers, as a fibrous layer 112, and a resin layer or film 114. The fibrous layer 112 has a top or first side 116 (shown in phantom) and a bottom or second side 118. The fibrous layer 112 has a thickness (T1) that is measured between the first side 116 and second side 118 of the fibrous layer. The resin layer 114 has an outer surface 120 and an inner surface 122. The uncured resin that makes up the resin layer partially penetrates into the fibrous layer to an impregnation depth (P1), which is the distance between the first side 116 of the fibrous layer and the inner surface 122 of the resin layer.

Semipreg 110 in accordance with the present invention for use in making rocket booster casings will have an impregnation depth (P1) that is less than fibrous layer thickness (T1). Typically, the impregnation depth (P1) will vary, but should be sufficiently less than the fibrous layer thickness (T1) so as to provide a resin-free zone adjacent to the second side 118 of the fibrous layer through which gas may escape during curing.

The semipreg 110 is a 1-film semipreg in which the resin layer 114 is applied as a single film or layer of uncured resin. The thickness of the resin layer 114 is chosen to provide a semipreg 110 that has a resin content of from 30 to 40 weight percent based on the total weight of the semipreg. Semipreg with a resin content of 34 to 36 weight percent is preferred. The areal weight (grams per square meter—gsm) of the semipreg 110 will typically range from 100 to 300 gsm for a typical rocket booster casing. Semipreg areal weight of from 170 to 210 gsm are particularly preferred.

Any of the DEN/TRIF and DEN/TRIF/TETF resins in accordance with the present invention may be used to form the resin layer 114 of the 1-film semipreg 110. Preferred uncured resins for use in making the resin layer or film 114 are DEN/TRIF/TETF matrix resins that have the formulations set forth in TABLE 14. The formulation set forth in parenthesis in TABLE 14 is a particularly preferred exemplary 1-film resin layer.

TABLE 14

| Ingredient | Amount (Wt %) |
| --- | --- |
| Hydrocarbon epoxy novola resin (TACTIX ® 556) | 13.3-15.3 (14.3) |
| Trifunctional para-glycidyl amine (MY0510) | 18.4-20.4 (19.4) |
| N,N,N',N'-tetraglycidyl-4,4'-diaminodiphenyl methane (MY721) | 17.1-19.1 (18.1) |
| Thermoplastic Toughening Agent (polyether sulfone - 5003P) | 9.5-11.5 (10.5) |
| Polyimide Particles (P84HCM) | 2.0-4.0 (3.0) |
| Polyamide Particle (TR90) | 8.0-10.0 (9.0) |
| Aromatic diamine curing agent (3,3-DDS) | 24.7-26.7 (25.7) |

Figure 7:
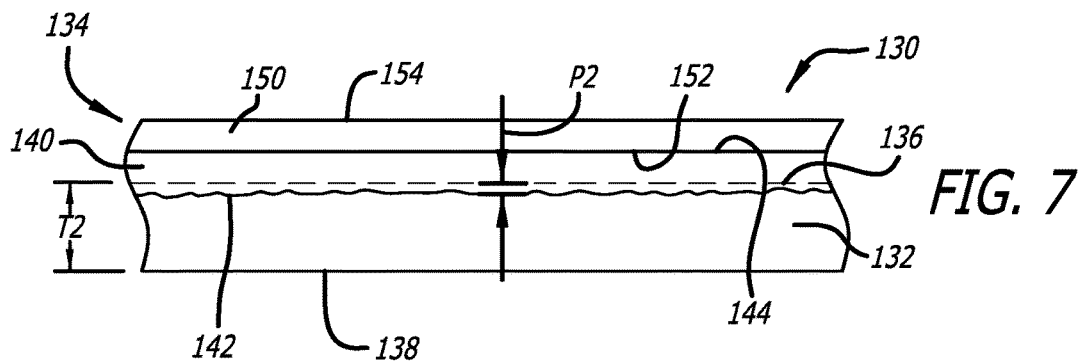
FIG. 7 is a simplified representation of an exemplary semipreg in which the resin matrix has been applied as two films or layers.

A 2-film semipreg is shown in FIG. 7 at 130. The 2-film semipreg 130 includes reinforcement fibers, as a fibrous layer 132, and a resin layer or film 134. The fibrous layer 132 has a top or first side 136 (shown in phantom) and a bottom or second side 138. The fibrous layer 132 has a thickness (T2) that is measured between the first side 136 and second side 138 of the fibrous layer. The resin layer 134 is composed of a first portion or first film of particle-free uncured resin 140 that is located on the first side 136 of the fibrous layer. The first film of uncured resin 140 has an inner surface 142 and an outer border 144. The first film of uncured resin 140 partially penetrates into the fibrous layer to an impregnation depth (P2), which is the distance between the first side 136 of the fibrous layer and the inner surface 142 of the resin layer.

Semipreg 130 in accordance with the present invention for use in making rocket booster casings will have an impregnation depth (P2) that is less than fibrous layer thickness (T2). Typically, the impregnation depth (P2) will vary, but should be sufficiently less than the fibrous layer thickness (T2) so as to provide a resin-free zone adjacent to the second side 138 of the fibrous layer through which gas may escape during curing.

The resin layer 134 of the 2-film semipreg includes a second portion or second film of particle-rich uncured resin 150. The second film of uncured resin 150 has an inner border 152 and an outer surface 154. The inner border 152 of the second film is located at the outer border 144 of the first film.

Figure 5:
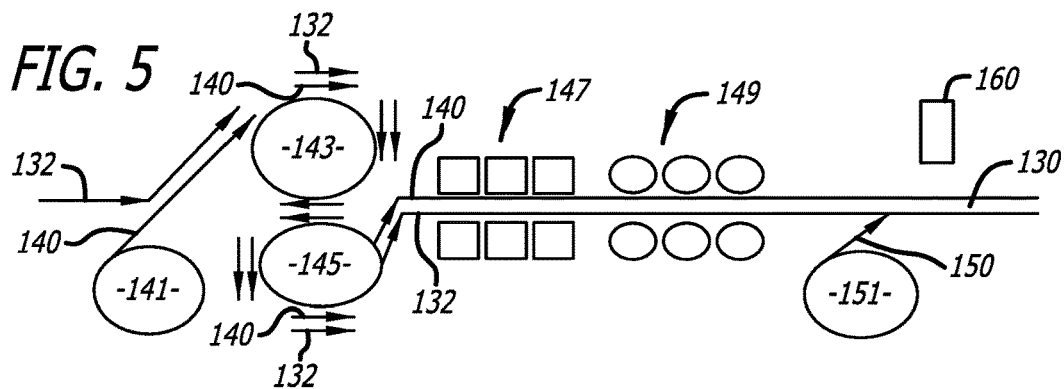
FIG. 5 is a schematic representation of an exemplary method for making a prepreg (semipreg) for use in out of autoclave molding of a rocket booster casing.

An exemplary method for making a 2-film semipreg 130 in accordance with the present invention is set forth in FIG. 5. As shown in FIG. 5, the first film of uncured resin 140 is unwound from reel 141 and applied to the fibrous layer 132. The first film of uncured resin 140 is impregnated into the fibrous layer 132 to an impregnation depth (P2) by passing the combined fibrous layer and first film over S-rollers 143/145 and then through compactors 147 and nip rollers 149 in accordance with known impregnation procedures. The various parameters, such as line tension, line speed, compaction pressure/temperature and nip pressure/temperature, are controllable to provide a variety of desired impregnation depths.

The second film of uncured resin 150 is unwound from reel 151 and applied to the outer border 144 of the first film. An infra-red (IR) heat lamp or other suitable heat source 160 is used to briefly heat the assembly, if required, in order to ensure that the second film of uncured resin 150 becomes adhesively attached to the first film 140 to provide the 2-film semipreg 130.

The combined thickness of the first and second resin films 140 and 150 is chosen to provide a 2-film semipreg 130 which, like the 1-film semipreg 110, has a resin content of from 30 to 40 weight percent based on the total weight of the semipreg. 2-film semipreg with a resin content of 34 to 36 weight percent is preferred. The areal weight of the 2-film semipreg 130 will typically range from 170 to 210 gsm for a typical rocket booster casing.

It is preferred that the first and second films are equal in thickness so that they each contribute 50 weight percent of the total resin content. If desired, the relative thicknesses of the two films may be varied so that one or the other film contributes as little as 40 weight percent of the total resin content or as much as 60 weight percent of the total resin content.

Any of the DEN/TRIF and DEN/TRIF/TETF resins in accordance with the present invention may also be used to form the resin films 140 and 150 of the 2-film semipreg 130. It is preferred that the combination of the two resin films 140 and 150 provides the same overall resin formulation as the single resin layer 114 of the 1-film semipreg as set forth in TABLE 14. The first resin portion or film 140 is preferably a particle-free uncured resin that is free of the thermoplastic particle component. Being free of the thermoplastic particle component means that the uncured resin film contains less than 1 percent by weight of thermoplastic particles of the type used in the thermoplastic particle component and preferably less than 0.5 weight percent. The second resin portion or film 150 is preferably a particle-rich uncured resin that includes the total amount of thermoplastic particle component for the overall resin film layer 134.

The inclusion of the thermoplastic component as particles located only in the second resin film 150 is preferred. The initial application of a particle-free first resin film 140 avoids issues, such as fiber-induced filtering and concentration of the particles or particle-induced fiber disruption, that might occur as the uncured resin interacts with the fibrous layer during formation of the semipreg and subsequent curing.

Preferred uncured resins for use in making the resin layers or films 130 and 140 are DEN/TRIF/TETF matrix resins that have the formulations set forth in TABLE 15. The formulations set forth in parenthesis in TABLE 15 are particularly preferred exemplary resin film layers. The uncured resin formulations set forth in TABLE 15 provide an overall combined resin formulation for layer 130 that matches the resin formulations for single resin layer 114 set forth in TABLE 14 provided that the first and second films 140 and 150 each form 50 wt % of the resin layer 130.

The formulations set forth in TABLE 15 may be varied to achieve an overall resin formulation for resin layer 130 that matches the single layer resin formulations set forth in TABLE 14. For example, if the first film 140 makes up 55 weight percent of resin layer 130 and second film 140 makes up 45 weight percent, then the formulations set forth in TABLE 15 may be adjusted to achieve an overall formulation that matches the formulations set forth in TABLE 14.

TABLE 15

| Ingredient | 1st Film (140) (Wt %) | 2nd Film (150) (Wt %) |
|---|---|---|
| Hydrocarbon epoxy novolac resin (TACTIX ® 556) | 15.2-17.2 (16.2) | 11.3-13.3 (12.3) |
| Trifunctional para-glycidyl amine (MY0510) | 21.0-23.0 (22.0) | 15.8-17.8 (16.8) |
| N,N,N',N'-tetraglycidyl-4,4'-diaminodiphenyl methane (MY721) | 19.6-21.6 (20.6) | 14.6-16.6 (15.6) |
| Thermoplastic Toughening Agent (polyether sulfone - 5003P) | 10.9-12.9 (11.9) | 8.1-10.1 (9.1) |
| Polyimide Particles (P84HCM) | <0.1 (0) | 5.0-7.0 (6.0) |
| Polyamide Particle (TR90) | <0.1 (0) | 17.0-19.0 (18.0) |
| Aromatic diamine curing agent (3,3-DDS) | 28.2-30.2 (29.3) | 21.2-23.2 (22.2) |

Figure 8:
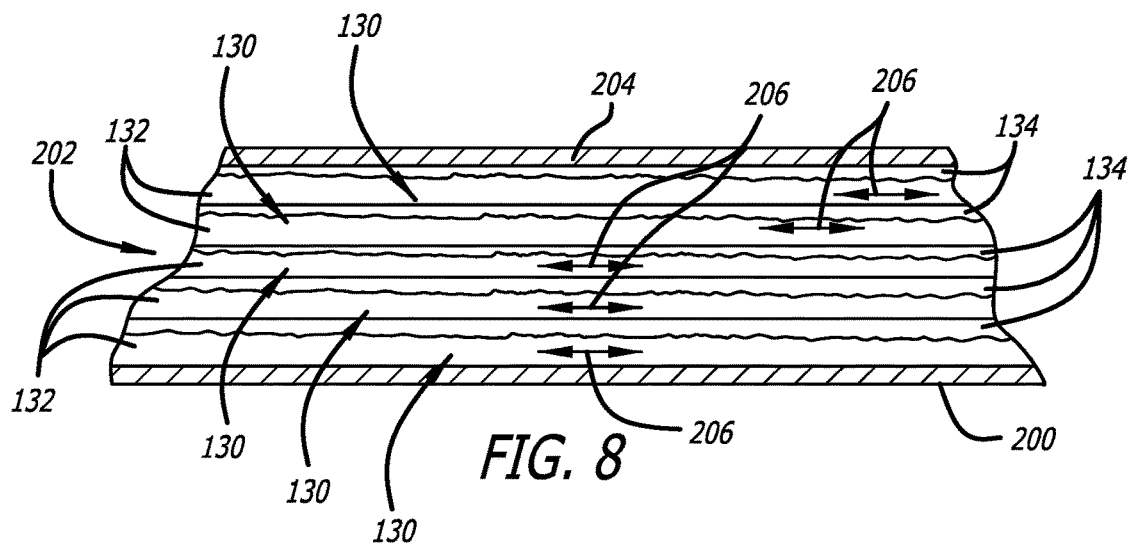
FIG. 8 shows a portion of an exemplary lay up of semipreg during out-of-autoclave curing in a vacuum bag.

The semipreg 110 or 130 is used to form rocket booster casing by forming a multiple layered laminate on a suitable cylindrical mold. The laminate is then cure using a cure cycle having a maximum dwell temperature of between 160° C. and 190° C. in accordance with known vacuum bagging procedures where a vacuum of approximately 29 inches (737 mm) of mercury (Hg) is applied during the curing cycle. A portion of a mold for making cylindrical rocket booster casing is shown at 200 in FIG. 8. An uncured laminate 202, which is shown composed of 5 semipreg layers 130 for exemplary purposes. A vacuum bag 204 is used to surround the laminate 202 to facilitate application of a vacuum to the laminate. It is preferred that the fibrous layer 132 be located next to the mold 200 and that the semipreg layers be oriented as shown in FIG. 8 so that the resin layer 130 is located next to the vacuum bag 204. This semipreg orientation allows gases generated during curing of the resin can escape from the laminate via the fibrous layers 132, as shown by arrows 206, as the resin flows throughout the laminate to provide the cured rocket booster casing.

Exemplary 2-film semipregs 130 were made using unidirectional 12K IM7 carbon fibers as the fibrous layer 132 and resin films 140/150 having the preferred resin formulations as set forth in TABLE 15. The semipregs were made using the system set forth in FIG. 5. The resulting semipreg tapes were 12 inches wide and each had an areal weight of 190 gsm. The resin content of each semipreg was 35 weight percent.

Laminates composed of 24 layers of the semipreg were formed on a cylindrical mold in the orientation shown in FIG. 8 and vacuum bag cured under a vacuum of 767 mm Hg. The cure cycle was as follows: 1) 1.7° C./min to 60° C. for 2 hours; 2) 1.1° C./min to 121° C. for 2 hours; and 3) 1.7° C./min to 177° C. for two hours. The cured tubular laminates each had an internal diameter of 3.0 inches, a length of 12 inches and a wall thickness of 0.17 inch. The tubular laminates each had an average porosity, as measured by visual imaging of cross sections of the laminate, of less than 0.2 percent.

Tubular laminates were prepared and cured in the same manner as the 24 layer laminates, except each laminate contained 44 layers of semipreg. The cured tubular laminates had an internal diameter of 3.2 inches, a length of 12 inches and a wall thickness of 0.33 inch. The tubular laminates each had an average porosity, as measured by visual imaging of cross sections of the laminate, of less than 0.2 percent. Based on these examples, cured tubular laminates that have larger diameters, longer lengths and thicker walls, such as rocket booster casings, are expected to also have porosities of less than 0.2 percent.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An uncured rocket booster casing which comprises semipreg comprising:
   A) a fibrous layer comprising carbon fibers, said fibrous layer comprising a first side and a second side, said fibrous layer having a thickness defined by the distance between said first side and said second side; and
   B) a resin layer comprising uncured resin located on the first side of said fibrous layer, said uncured resin penetrating into said fibrous layer to an impregnation depth, said impregnation depth being less than the thickness of said fibrous layer, said uncured resin comprising:
      a) an epoxy resin component comprising a hydrocarbon epoxy novolac resin and a triglycidyl aminophenol epoxy resin;
      b) a thermoplastic particle component comprising a combination of polyimide particles and particles that comprise a polyamide which is the polymeric condensation product of 1,10-decane dicarboxylic acid and an amine component having the formula

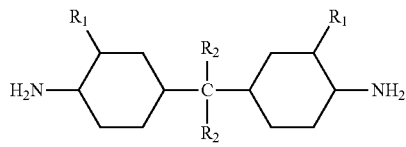

where both $R_2$ are hydrogen and both $R_1$ are methyl or hydrogen;
      c) a thermoplastic toughening agent which comprises polyether sulfone; and
      d) a curing agent.

2. An uncured rocket booster casing according to claim 1 wherein said epoxy resin component further comprises N,N,N',N'-tetraglycidyl-4,4'-diaminodiphenyl methane.

3. A rocket booster casing which comprises an uncured rocket booster casing according to claim 2 wherein said uncured resin has been cured.

4. A method for making a rocket booster casing comprising the steps of providing an uncured rocket booster casing according to claim 2 and curing said uncured resin to form said rocket booster casing.

5. An uncured rocket booster casing according to claim 1 wherein said curing agent comprises an aromatic amine.

6. A rocket booster casing which comprises an uncured rocket booster casing according to claim 5 wherein said uncured resin has been cured.

7. A method for making a rocket booster casing comprising the steps of providing an uncured rocket booster casing according to claim 5 and curing said uncured resin to form said rocket booster casing.

8. An uncured rocket booster casing according to claim 1 wherein said resin layer comprises:
   A) a first portion of uncured resin located on the first side of said fibrous layer, said first portion of uncured resin penetrating into said fibrous layer to said impregnation depth and having an outer border, said first portion of uncured resin comprising said uncured resin which does not include said thermoplastic particle component;
   B) a second portion of uncured resin located on the outer border of said first portion of uncured resin, said second portion of uncured resin comprising said uncured resin.

9. A rocket booster casing according to claim 8 wherein said first portion of uncured resin and said second portion of uncured resin have been cured.

10. A method for making a rocket booster casing comprising the step of providing an uncured rocket booster casing according to claim 8 and curing said first portion of uncured resin and said second portion of uncured resin to form said rocket booster casing.

11. A rocket booster casing which comprises an uncured rocket booster casing according to claim 1 wherein said uncured resin has been cured.

12. A method for making a rocket booster casing comprising the steps of providing an uncured rocket booster casing according to claim 1 and curing said uncured resin to form said rocket booster casing.

* * * * *